United States Patent [19]

Argenta et al.

[11] Patent Number: 5,267,047
[45] Date of Patent: Nov. 30, 1993

[54] APPARATUS AND METHOD OF OPERATION FOR A FACSIMILIE SUBSYSTEM IN AN IMAGE ARCHIVING SYSTEM

[75] Inventors: Joseph T. Argenta, Monrovia; David C. Bailey, Gaithersburg; Harold F. DeBruyn, Gaithersburg; Hugh M. Morris, Gaithersburg, all of Md.

[73] Assignee: International Business Machines Corporation, Armonk, N.Y.

[21] Appl. No.: 693,739

[22] Filed: Apr. 30, 1991

[51] Int. Cl.$^5$ .................. H04N 1/00; H04N 1/387; G06F 15/00
[52] U.S. Cl. .................... 358/400; 358/403; 358/450; 395/148; 395/149
[58] Field of Search ............... 358/400, 401, 402, 403, 358/407, 434, 440, 442, 450, 452, 468; 395/144, 145, 148, 149, 155, 128

[56] References Cited

U.S. PATENT DOCUMENTS

| | | | |
|---|---|---|---|
| 4,139,901 | 2/1979 | Ganske et al. | 395/425 |
| 4,164,024 | 8/1979 | Gilbert | 340/705 |
| 4,174,890 | 11/1979 | Johnson et al. | 353/26 A |
| 4,197,590 | 4/1980 | Sukonick et al. | 340/721 |
| 4,205,387 | 5/1980 | Ovahinsky et al. | 346/151 |
| 4,485,454 | 11/1984 | Kimoto | 395/600 |
| 4,521,096 | 6/1985 | Suganuma et al. | 359/149 |
| 4,553,206 | 11/1985 | Smutek et al. | 395/275 |
| 4,553,261 | 11/1985 | Froessl | 382/51 |
| 4,574,395 | 3/1986 | Kato | 382/61 |
| 4,601,003 | 7/1986 | Yoneyama et al. | 395/159 |
| 4,635,136 | 1/1987 | Ciampa et al. | 358/342 |
| 4,672,186 | 6/1987 | Van Tyne | 235/470 |
| 4,847,694 | 7/1989 | Nishihara | 358/434 |
| 4,893,333 | 1/1990 | Baran et al. | 358/468 |
| 5,025,396 | 6/1991 | Parks et al. | 359/148 |
| 5,058,185 | 10/1991 | Morris et al. | 359/155 |
| 5,153,936 | 10/1992 | Morris et al. | 359/128 |

FOREIGN PATENT DOCUMENTS

| | | |
|---|---|---|
| 8704826 | 8/1987 | European Pat. Off. |
| 8705767 | 9/1987 | European Pat. Off. |
| 8705768 | 9/1987 | European Pat. Off. |

Primary Examiner—Edward L. Coles, Sr.
Assistant Examiner—Thomas D. Lee
Attorney, Agent, or Firm—John E. Hoel

[57] ABSTRACT

A system-wide data stream compatibility is provided for a FAX server in an image archiving system, by the concealment of FAX cover sheet and distribution list object handling information, which is uniquely required by the FAX server, in an otherwise unneeded document descriptor field located outside of the data stream boundary, in the distribution service or session header. In addition, the FAX server provides for the storage of multiple cover sheets and addressee distribution lists which are editable. The FAX server can manage multiple transmissions of FAX messages with customized cover sheets, to multiple addressees in the distribution lists.

35 Claims, 34 Drawing Sheets

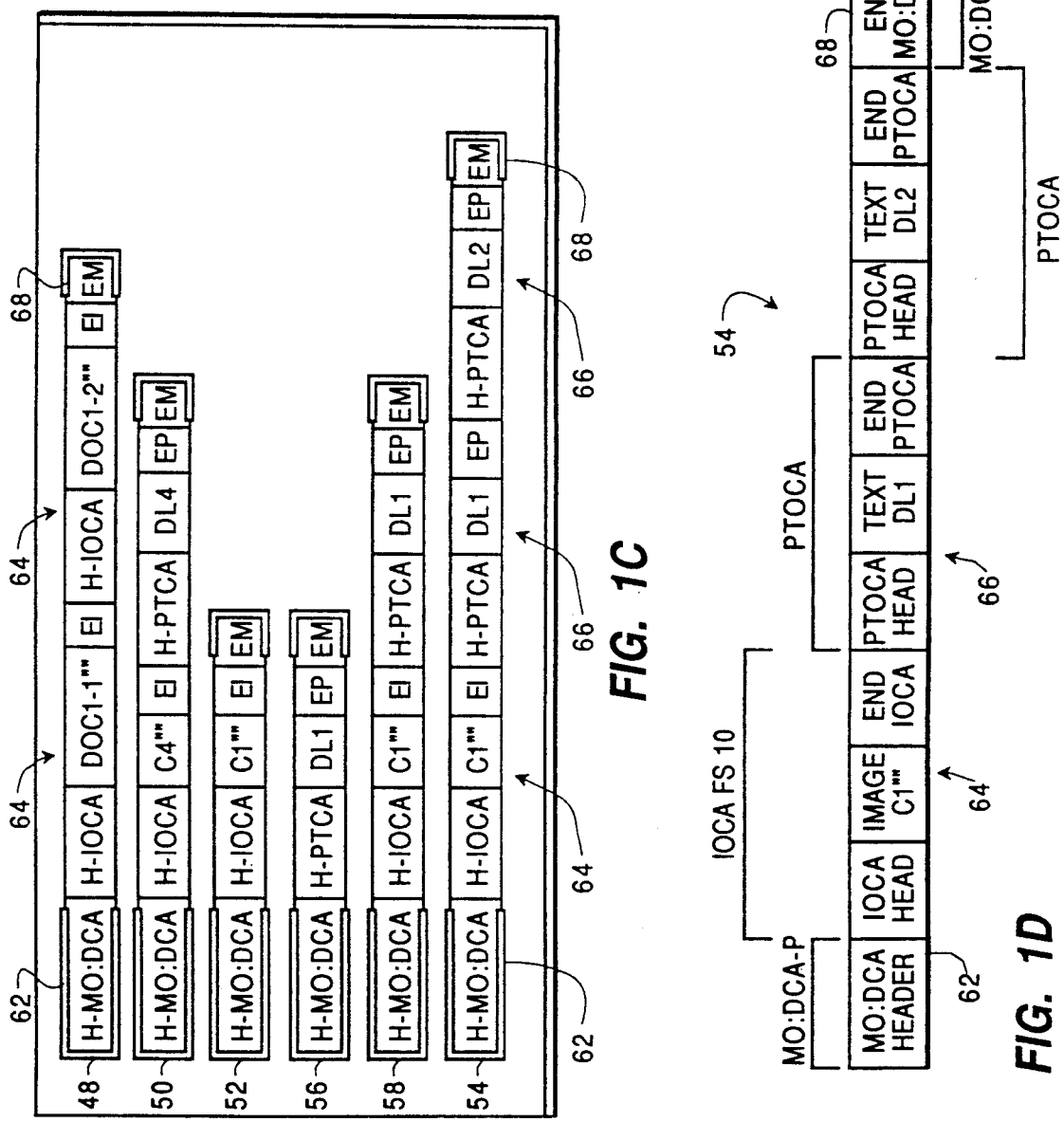

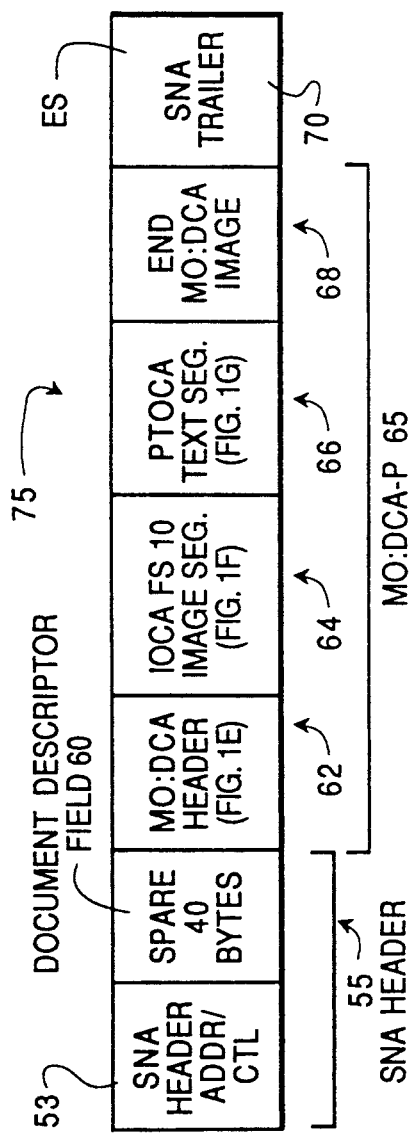
FIG. 1H
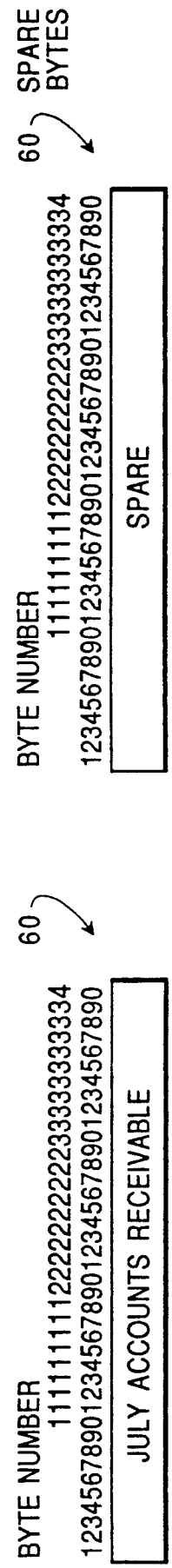
FIG. 1lb
FIG. 1la

FIG. 12A

```
FAX CUSTOMER DATA PANEL

CUSTOMER ID = A. LINCOLN

ITEM    DESCRIPTION              PAGES

1       LETTER 1/21/91           2
2       ADVERTISING FLYER        1
3       BILL 1/30/91             1
4       NEW COVER SHEET "3"      1
5       NEW DIST. LIST "A"       1

[ENTER] = FAX ADDRESSEE MENU
```

FIG. 12B

```
FAX ADDRESSEE MENU

PHONE NUMBER     = 3016401234
RECIPIENT NAME   = J SMITH
TIME TO FAX      = 0400
SELECT PAGES     = 001 - 002
COVER SHEET      = 3

[ENTER] = SEND

[ALT-TAB] = FAX FORMAT MENU
```

FIG. 12C

```
FAX FORMAT MENU

ENTER LOCATION OF:

RECIPIENT NAME    Nx,y =
PHONE NUMBER      Tx,y =
PAGE COUNT        Px,y =
DATE              Dx,y =

[ENTER] = RETURN TO ADDRESSEE MENU
```

APPARATUS AND METHOD OF OPERATION FOR A FACSIMILIE SUBSYSTEM IN AN IMAGE ARCHIVING SYSTEM

BACKGROUND OF THE INVENTION

Technical Field

The invention disclosed broadly relates to data processing systems and more particularly relates to a facsimile server subsystem in an image archiving system.

Background Art

Documents can be optically scanned and their images digitized and stored in a data processing system. An example of a system for storing and manipulating digitized images of documents is provided in the copending patent application by C. A. Parks, et al. entitled "Dual Density Digital Image System," Ser. No. 211,646, filed Jun. 27, 1988, assigned to the IBM Corporation and incorporated herein by reference now U.S. Pat. No. 5,155,396. Another copending patent application is by C. A. Parks, et al. entitled "Object Management and Delivery System Having Multiple Object Resolution Capability," Ser. No. 211,722, filed Jun. 27, 1988, assigned to the IBM Corporation and incorporated herein by reference, now U.S. Pat. No. 5,058,185. These two patent applications describe an example digital image archiving system within which the invention described herein finds application.

The digitized images of documents are compressed and stored in image files referred to as image objects. An example of a data architecture which enables the interchange of information including images, text and graphics is the Mixed Object Document Content Architecture—Presentation (MO:DCA-P). The MO:DCA-P architecture is described, for example in the publication "Mixed Object Document Content Architecture Reference," SC31-6802, IBM Corporation; available through IBM branch offices. The MO:DCA-P environment is used to describe documents that are interchanged among data processing systems. Each document consists of one or more pages with each page of the document containing an image, presentation text, graphics data or a combination of the three. Within a MO:DCA-P envelope, images can be represented by an image architecture such as image object content architecture (IOCA). The purpose of IOCA is to provide a standard method by which image applications and products can represent images. IOCA is described for example in the publication "Image Object Content Architecture Reference," SC31-6805, IBM Corporation; available through IBM branch offices. IOCA is also described in the publication "Architectures for Object Interchange," GG24-3296, IBM Corporation; available through IBM branch offices.

Within the MO:DCA-P envelope, text can be represented by a presentation text architecture such as the Presentation Text Object Content Architecture (PTOCA). After text has been formatted, it is in presentation form, the text is ready to be presented at an output device such as a printer. A presentation text object describes the portion of the text document which has been generated from sources such as from formatting processes, application programs, or transformation from text of different presentation formats. PTOCA describes presentation text objects in a document. PTOCA is described in greater detail in the IBM publication "Presentation Text Object Content Architecture Reference," Order Number SC31-6803, available through IBM branch offices.

All image applications scan, store, retrieve, display, print or exchange images within or across image applications. These activities can be generalized as creating, exchanging, storing, retrieving, and outputting images. In creating an image, a scanner or a video camera forms a digitized image of the document. The digitized image can then be pre-processed to remove device dependent information from the image. As a result, a digitized image is generated which has the characteristics of resolution and size, which do not depend on the method by which the image was captured. Next, an image processing step is performed on the digitized image which can include actions such as storing the image, retrieving the image, distributing the image, modifying the image, and using the image in an application. Then post-processing steps can be applied in the support of output devices. This will require the addition of device control information such as printing control characters. Finally, the post-processed image can be output to a printer, display or other type of output device.

It is the step of processing the image which is performed on device independent images, which are free of all application and device unique features, which is where the IOCA architecture is employed. The base structure for the image is an image segment and the IOCA structure serves to represent images in the image segment. The structure of the image segment consists of image data parameters and image data. The image data parameters include the image dimension and resolution, the recording sequence, the compression technique, the number of bits per pixel, the pixel structure, and any look-up table information. IOCA is implemented as function sets. For example, Function Set 10 (FS10) enables the interchange of bi-level images. The two compression algorithms supported by this function set are the IBM modified CCITT Modified Read Algorithm and the CCITT T.6 Group 4 Facsimile Coding Scheme. These two compression algorithms are described in the article by K. L. Anderson, et al. entitled "Binary Image Manipulation Algorithms in the Image View Facility," *IBM Journal of Research and Development*, 931, No. 1, pp. 16-31 (January 1987), and the publication "CCITT Recommendation T.6," *CCITT T Series*, Vol 7, Part 7.3, International Telecommunication Union, Geneva (1985), respectively.

In summary, the Mixed Object Document Content Architecture—Presentation (MO:DCA-P) is a carrier data stream that consists of objects and the layout information that specifies how a document is to be printed or displayed. Objects may be in line as part of the document, or they may reside in an external library. Objects that can be carried in MO:DCA-P include PTOCA text, IOCA image, graphics and fonts. Image Object Content Architecture (IOCA) is the data stream for images, the purpose of which is to put the image data into a format that can be understood by another program. Things such as type of image, width, length, resolution, compression type, and such are carried in the data stream. Then an image becomes self-contained so that other programs can interpret the image without referencing a separate data base. MO:DCA-P is used to describe where on a page an image is to be placed. The MO:DCA-P format is used as an envelope to surround the PTOCA text and the IOCA description of the image.

Transmission objects such as text in a PTOCA segment and images in an IOCA segment are encapsulated in a data stream. A data stream has a continuous ordered stream of data elements conforming to a given format. An example of a data stream is MO:DCA. Other examples of data streams are Intelligent Printer Data Stream (IPDS), 3270 Data Stream (3270 DS), Character Data Representation Architecture (CDRA) and Revisable Form Text: Document Content Architecture (RFT:DCA). When data streams such as MO:DCA are transmitted in a data processing system, they are encapsulated in an application service or a session service Application services enhance the activity of the network by providing architectures that allow data distribution, document interchange, and network management. Application service architecture include the system network architecture SNA/distribution services. Other application services include Document Interchange Architecture (DIA). In contrast, session services are used to establish communication between two application programs. An example of a session service is the SNA Logical Unit Type 6.2 (LU6.2) architecture. An LU6.2 conversation provides a logical interface through which transaction programs can access the SNA network and its resources. When a data stream such as MO:DCA is encapsulated in an application service such as the SNA/distribution service or a session service such as the SNA LU6.2 architecture, it is positioned between an SNA header and an SNA trailer. Additional information on the SNA architecture can be found in the IBM publication "Systems Network Architecture Format and Protocol Reference Manual: Architectural Logic," IBM Order No. SC30-3112-2, available from IBM branch offices. An overview of the concepts of objects, data streams, application services and session services can be found in the IBM publication "Systems Application Architecture, Common Communications Support Summary," IBM No. GC31-6810, available from IBM branch offices.

In the IBM ImagePlus document image system, image objects and text objects are IOCA and PTOCA objects, respectively. Every workstation, host, printer, scanner, transmission device and storage device is designed to operate in the system with IOCA and PTOCA objects contained in a MO:DCA envelope, using their common existing format. The MO:DCA envelope forms the data stream which is encapsulated in an SNA packet for accessing, distributing or interchanging the documents in a message service such as the SNA/Distribution Service (SNA/DS) or which is encapsulated in an SNA packet for a transaction session and conversation service such as the SNA Logical Unit Type 6.2 (SNA/LU6.2) service. Both the SNA/DS and the SNA/LU6.2 services encapsulate the MO:DCA data stream between an SNA header and an SNA trailer. The SNA header includes a document descriptor field which is intended to hold an alphanumeric string label for optional printing on the cover or in the margin of hard copies of the document, to facilitate manual sorting and handling of the hard copy. When the host receives an incoming SNA packet with a command to the host to output a MO:DCA envelope from the host storage, the host removes the document descriptor field from the incoming packet and appends it as the document descriptor field in the new SNA packet which it uses to encapsulate the MO:DCA envelope which it outputs.

The prior art has not provided an improved FAX server subsystem for an image archiving system which provides system-wide data stream compatibility.

The prior art has not provided an improved FAX server subsystem for an image archiving system which enables all other devices in the image system to handle the image and text objects contained in the data stream, in their normal manner.

The prior art has not provided an improved FAX server subsystem for an image archiving system which forms a composite cover sheet image with the addressee text thereon, for a sequence of addressees on a distribution list.

The prior art has not provided an improved FAX server subsystem for an image archiving system which provides a plurality of cover sheet images and their associated overlay text to enable users throughout the image system to use customized cover sheets of their own personal design.

The prior art has not provided an improved FAX server subsystem for an image archiving system which provides for new cover sheet images to be sent to the FAX server over the telephone network and FAX equipment connected to the FAX server, for editing and storage in the server.

The prior art has not provided an improved FAX server subsystem for an image archiving system which provides for previously stored cover sheet images at the FAX server to be accessed, decompressed and re-edited to alter the graphical appearance or the text format.

The prior art has not provided an improved FAX server subsystem for an image archiving system which provides for addressee distribution lists which can also be stored in the FAX server, each containing a customized list of addressee names and telephone numbers.

The prior art has not provided an improved FAX server subsystem for an image archiving system which provides for a plurality of distribution lists to be stored in the FAX server, to enable users throughout the image system to use customized distribution lists of their own personal design.

OBJECTS OF THE INVENTION

It is an object of the invention to provide an improved FAX server subsystem for an image archiving system which provides system-wide data stream compatibility.

It is another object of the invention to provide an improved FAX server subsystem for an image archiving system which enables all other devices in the image system to handle the image and text objects contained in the data stream, in their normal manner.

It is another object of the invention to provide an improved FAX server subsystem for an image archiving system which provides the document descriptor field in the SNA header to hold addressee information which is to be used by the FAX server for transmitting a document by FAX.

It is another object of the invention to provide an improved FAX server subsystem for an image archiving system which forms a composite cover sheet image with the addressee text thereon.

It is another object of the invention to provide an improved FAX server subsystem for an image archiving system which provides new cover sheets to the FAX server in the form of IOCA image objects in a MO:DCA envelope which has the same external appearance as any other MO:DCA envelope in the image system.

It is another object of the invention to provide an improved FAX server subsystem for an image archiving system which provides a plurality of cover sheet images and their associated overlay text which are stored on the DASD in the FAX server, to enable users throughout the image system to use customized cover sheets of their own personal design.

It is another object of the invention to provide an improved FAX server subsystem for an image archiving system which provides for new cover sheet images to be sent to the FAX server over the telephone network and FAX equipment connected to the FAX server.

It is another object of the invention to provide an improved FAX server subsystem for an image archiving system which provides for previously stored cover sheet images at the FAX server to be accessed from the DASD, decompressed and re-edited to alter the graphical appearance or the text format.

It is another object of the invention to provide an improved FAX server subsystem for an image archiving system which provides for addressee distribution lists which can also be stored in the FAX server, each containing a customized list of addressee names and telephone numbers.

It is another object of the invention to provide an improved FAX server subsystem for an image archiving system which provides for when the FAX server receives a MO:DCA envelope containing a document to be transmitted, accompanied by a document descriptor field in the SNA header specifying a particular distribution list, the FAX server starts a loop, each cycle of which will process the FAX transmission of the cover sheet and document pages to a consecutive one of the several addressees in the distribution list.

It is another object of the invention to provide an improved FAX server subsystem for an image archiving system which provides that for a FAX transmission block for the composite cover sheet to have been sent in a failed call attempt, the block is stored on the DASD in association with other addressee data so that the FAX transmission block does not have to be reconstructed when retry attempts are subsequently made.

It is another object of the invention to provide an improved FAX server subsystem for an image archiving system which provides for a plurality of distribution lists to be stored on the DASD in the FAX server, to enable users throughout the image system to use customized distribution lists of their own personal design.

SUMMARY OF THE INVENTION

One of the features of the invention is the provision of system-wide data stream compatibility by the concealment of FAX cover sheet and distribution list object handling information which is uniquely required by the FAX workstation, in an otherwise unneeded document descriptor field located outside of the data stream boundary, in the distribution service or session header.

In the IBM ImagePlus document image system, image objects and text objects are IOCA and PTOCA objects, respectively. Every workstation, host, printer, scanner, transmission device and storage device is designed to operate in the system with IOCA and PTOCA objects contained in a MO:DCA envelope, using their common existing format. The MO:DCA envelope forms the data stream which is encapsulated in an SNA packet for accessing, distributing or interchanging the documents in a message service such as the SNA/Distribution Service (SNA/DS) or which is encapsulated in an SNA packet for a transaction session and conversation service such as the SNA Logical Unit Type 6.2 (SNA/LU6.2) service. Both the SNA/DS and the SNA/LU6.2 services encapsulate the MO:DCA data stream between an SNA header and an SNA trailer. The SNA header includes a document descriptor field which is intended to hold an alphanumeric string label for optional printing on the cover or in the margin of hard copies of the document, to facilitate manual sorting and handling of the hard copy. When the host receives an incoming SNA packet with a command to the host to output a MO:DCA envelope from the host storage, the host removes the document descriptor field from the incoming packet and appends it as the document descriptor field in the new SNA packet which it uses to encapsulate the MO:DCA envelope which it outputs.

In accordance with the invention, FAX cover sheet and distribution list object handling information and addressee information which are uniquely required by the FAX workstation, are concealed in the document descriptor field of the SNA header. This enables all other devices in the image system to handle the IOCA and PTOCA objects contained in the data stream, in their normal manner, since they ignore the contents of the document descriptor field.

Specifically, in accordance with the invention, the document descriptor field in the SNA header is used to hold addressee information which is to be used by the FAX workstation for transmitting a document by FAX to a single named addressee. The field is used to hold the phone number and name of the addressee, the time to start sending the transmission, the range of pages for the document to be sent and the selection of a particular one of several cover sheets which are stored at the FAX workstation. The SNA packet encapsulates a MO:DCA envelope which contains the IOCA objects for the images of the pages of the document which is to be transmitted by FAX to the addressee.

Further in accordance with the invention, when a cover sheet image stored on the DASD at the FAX workstation is being prepared by the FAX workstation for transmission, the image of the cover sheet is placed in a first bit plane buffer. Then the alphanumeric text representing the addressee information in the document descriptor field undergoes a character image generation step to produce the image of the characters, which are then placed in a second bit plane buffer at locations whose coordinates are derived from text formatting data associated with the cover sheet image. Then the FAX workstation performs a logical OR operation of the first and second bit planes, forming a composite cover sheet image with the addressee text thereon, which is placed in a third bit plane. The composite cover sheet image is then converted into a FAX transmission block format. The addressee's telephone number from the document descriptor field is then output to a telephone dialing component of the FAX transmission equipment to initiate call placement. When the telephone call placement has been successfully made, the composite cover sheet FAX transmission block is output to the FAX transmission equipment, followed by the document pages to be transmitted.

New cover sheets are provided to the FAX workstation in the form of IOCA image objects in a MO:DCA envelope which has the same external appearance as any other MO:DCA envelope in the image system. In accordance with the invention, the document descriptor field in the SNA header is used to hold the control information which distinguishes the object as a new cover sheet image and provides its identity. The FAX workstation handles the new cover sheet image differently from other document images. If the document descriptor field also contains text formatting information for the location of addressee data to be overlaid on the image, then the new cover sheet image is stored on the DASD in the FAX workstation in association with the text format data, ready to use for FAX transmissions. Alternately, if the document descriptor field does not contain the text formatting information, then FAX workstation enables an editing function, allowing an operator to enter the coordinates for the location of the addressee text to be overlaid onto the cover sheet. If the operator at the FAX workstation desires to alter the appearance of the graphical information on the cover sheet, or if the operator wishes to display an image of the cover sheet, then the FAX workstation decompresses the compressed image of the cover sheet to enable an operator at the workstation to perform these tasks. Thereafter, the edited cover sheet image is recompressed and stored, along with the overlay text format data, on the DASD at the workstation.

In accordance with the invention, a plurality of cover sheet images and their associated overlay text are stored on the DASD in the FAX workstation, to enable users throughout the image system to use customized cover sheets of their own personal design. Each user in the image system has the ability to scan in a hard copy of a customized cover sheet at his workstation. And each user also has the opportunity to employ a graphics editor at his workstation in the image system to create customized cover sheet images. These cover sheet images are then compressed and inserted into IOCA image objects at the user workstation and the IOCA object is placed in a MO:DCA envelope which has the same external appearance at that of any other MO:DCA envelope in the image system. The user can then transmit the MO:DCA envelope containing the new cover sheet to the host for storage on the host object storage. Since the new cover sheet image is to be stored at the host like any other MO:DCA object in the system, the document descriptor field in the SNA packet containing the MO:DCA envelope is left blank. Later, if the user wishes to download the new cover sheet image from the host to the FAX workstation, the command sent from the user workstation to the host is with an SNA packet whose document descriptor field includes the information that the MO:DCA envelope contained therein is a new cover sheet having a specified identity. This MO:DCA envelope is then processed as a new cover sheet at the FAX workstation, as previously described.

Alternately, new cover sheet images can be sent to the FAX workstation over the telephone network and FAX equipment connected to the FAX workstation. The incoming FAX transmission block received at the FAX workstation is converted into a bit plane image which may be edited by the operator at the FAX workstation to generate text formatting data for the overlay text. Then the bit plane image of the new cover sheet is compressed and is stored on the DASD a the FAX workstation under an accessible name and in association with the text formatting data.

Further, in accordance with the invention, previously stored cover sheet images at the FAX workstation can be accessed from the DASD, decompressed and reedited to alter the graphical appearance or the text format. The edited image can then be recompressed and stored back on the DASD, in association with new text formatting information, where desired. Since the formatting o the location for the text overlays onto the cover sheets is done by defining the coordinates for the location of the text, the editing of the text format can be done without decompressing the image of the cover sheet.

Addressee distribution lists can also be stored in the FAX workstation, each containing a customized list of addressee names and telephone numbers. Specifically, in accordance with the invention, the document descriptor field in the SNA header is used to hold distribution list information which is to be used by the FAX workstation for transmitting a document by FAX to several addressees who are named in the distribution list. The phone number field of the document descriptor field is used to contain an alpha character name which designates the specific distribution list which is stored on the DASD at the FAX workstation. The the time to start sending the transmission, the range of pages for the document to be sent and the selection of a particular one of several cover sheets which are stored at the FAX workstation, can also be provided. The SNA packet encapsulates a MO:DCA envelope which contains the IOCA objects for the images of the pages of the document which is to be transmitted by FAX to the addressees named in the distribution list.

Further in accordance with the invention, when the FAX workstation receives a MO:DCA envelope containing a document to be transmitted, accompanied by a document descriptor field in the SNA header specifying a particular distribution list, the FAX workstation prepares the FAX transmission blocks for the document pages to be sent. Then it accesses the designated cover sheet and its associated text formatting data from the DASD and places its image in the first bit plane buffer. Then the FAX workstation starts a loop, each cycle of which will process the FAX transmission of the cover sheet and document pages to a consecutive one of the several addressees in the distribution list. Each line in the distribution list contains the telephone number and the name of one addressee. For each line, the alphanumeric text representing the addressee name and phone number undergoes a character image generation step to produce the image of the characters, which are then placed in a second bit plane buffer at locations whose coordinates are derived from text formatting data associated with the cover sheet image. Then the FAX workstation performs a logical OR operation of the first and second bit planes, forming a composite cover sheet image with the addressee text thereon, which is placed in a third bit plane. The composite cover sheet image is then converted into a FAX transmission block format. The addressee's telephone number from the distribution list is then output to a telephone dialing component of the FAX transmission equipment to initiate call placement. When the telephone call placement has been successfully made, the composite cover sheet FAX transmission block is output to the FAX transmission equipment, followed by the document pages to be transmitted. The loop then cycles to the next line of the distribution for a repetition of the process, until all of the addressees in the list have been called. If a particular call is not successfully completed, its incomplete status is logged to the DASD. Further in accordance with the invention, the FAX transmission block for the composite cover sheet to have been sent in a failed call attempt, is stored on the DASD in association with other addressee data so that the FAX transmission block does not have to be reconstructed when retry attempts are subsequently made. After calls have been attempted for all of the addressees on the list, the log of incomplete calls is accessed and those incomplete calls are retried. After several retries, if a particular addressee's transmission cannot be completed, the trials are terminated and the failure is reported to the operator of the FAX workstation.

New distribution lists are provided to the FAX workstation in the form of PTOCA text objects in a MO:DCA envelope which has the same external appearance as any other MO:DCA envelope in the image system. In accordance with the invention, the document descriptor field in the SNA header is used to hold the control information which distinguishes the object as a new distribution list and provides its identity. The FAX workstation handles the new distribution list differently from other documents. The new distribution list is stored on the DASD in the FAX workstation ready to use for FAX transmissions, accessible by its name.

In accordance with the invention, a plurality of cover distribution lists are stored on the DASD in the FAX workstation, to enable users throughout the image system to use customized distribution lists of their own personal design. Each user in the image system has the ability to enter a customized distribution list at his workstation. The distribution list is inserted into a PTOCA text object at the user workstation and the PTOCA object is placed in a MO:DCA envelope which has the same external appearance at that of any other MO:DCA envelope in the image system. The user can then transmit the MO:DCA envelope containing the new distribution list to the host for storage on the host object storage. Since the new distribution list is to be stored at the host like any other MO:DCA object in the system, the document descriptor field in the SNA packet containing the MO:DCA envelope is left blank. Later, if the user wishes to download the new distribution list from the host to the FAX workstation, the command sent from the user workstation to the host is with an SNA packet whose document descriptor field includes the information that the MO:DCA envelope contained therein is a new distribution list having a specified identity. This MO:DCA envelope is then processed as a new distribution list at the FAX workstation, as previously described.

BRIEF DESCRIPTION OF THE DRAWINGS

These and other objects, features and advantages of the invention will be more fully appreciated with reference to the accompanying figures.

FIG. 1C shows the Host Object Storage 47.

FIG. 1D shows the MO:DCA, IOCA and PTOCA Formats for User and FAX Workstation.

FIG. 1H shows the SNA Packet containing MO:DCA Image and Text File 75.

FIG. 1Ia shows the prior art use of the Document Descriptor Field 60 is for 40 Character Alphanumeric String to be printed as a Title on Hard Copy Printout to Facilitate Manual Handling.

FIG. 1Ib shows in the prior art, the Document Descriptor Field 60' is Spare When the SNA Packet is used for non-printing Operations, such as transmitting an enclosed data object to the host for storage or transmitting an enclosed data object from the host to a workstation.

FIG. 1Ic shows the SNA Packet Transmission of Blank Document Descriptor Field 60 and MO:DCA Envelope Containing Document Image for Doc1 From User Workstation to Host For Storage in Object Storage 47.

FIG. 1Id shows the SNA Packet Transmission of Blank Document Descriptor Field 60 and MO:DCA Envelope Containing Cover Sheet Image for C1 From User Workstation to Host For Storage in Object Storage 47.

FIG. 1Ie shows the SNA Packet Transmission of Blank Document Descriptor Field 60 and MO:DCA Envelope Containing Distribution List Text DL1 From User Workstation to Host For Storage in Object Storage 47.

FIG. 1Nb shows the SNA Packet Sent from Host to FAX Workstation with Document Descriptor Data Field 60, including New Cover Sheet (ID=3) from Host to Send to FAX Workstation.

FIG. 1Pb shows the SNA Packet Sent from Host to FAX Workstation with Document Descriptor Data Field 60, including New Distribution List (ID=A) from Host to Send to FAX Workstation.

FIG. 1Qb shows the SNA Packet Sent from Host to FAX Workstation with Document Descriptor Data Field 60, including New Cover Sheet (ID=3) from Host to Send to FAX Workstation with Format Control Data CF1 in Name Field 82.

FIG. 1R*b* shows the SNA Packet Sent from Host to FAX Workstation with Document Descriptor Data Field 60, including Document Doc1 from Host to Send to FAX Workstation for Transmission with Cover Sheet (ID=3) (stored at FAX Workstation) for Single Specific FAX Addressee.

FIG. 1S*b* shows the SNA Packet Sent from Host to FAX Workstation with Document Descriptor Data Field 60, including Document Doc1 from Host to Send to FAX Workstation for Transmission with Cover Sheet (ID=3) (stored at FAX Workstation) for Many FAX Addressees Using Distribution List DL1 (ID=A).

FIG. 12A shows the FAX Customer Data Panel.
FIG. 12B shows the FAX Addressee Menu.
FIG. 12C shows the FAX Format Menu.

DISCUSSION OF THE PREFERRED EMBODIMENT

Figure 1A:
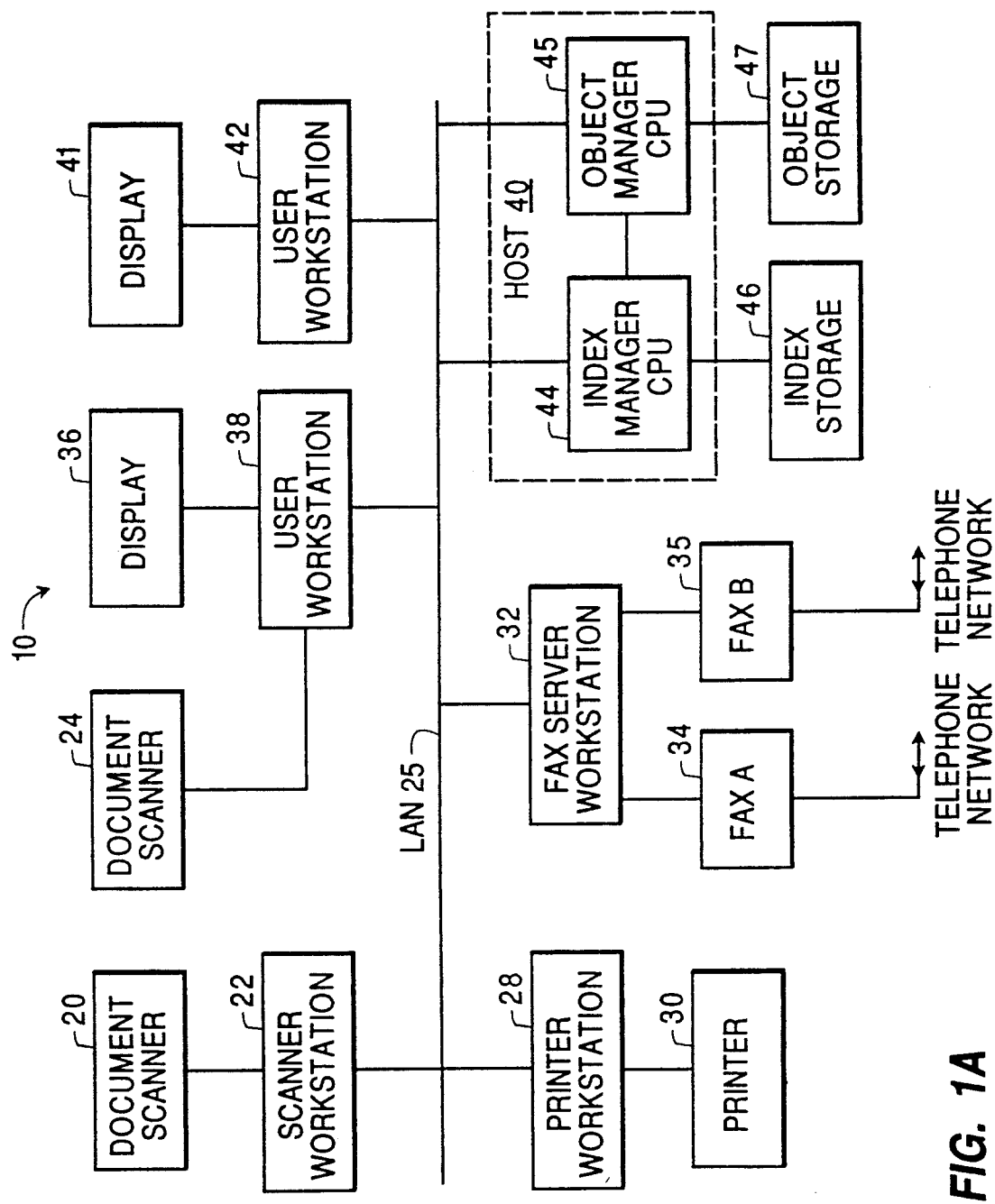
FIG. 1A shows the Image Archiving System 10.

FIG. 1A shows a first embodiment of an image archiving system 10 which is a host based system in which the host 40 is comprised of an index manager CPU 42 and an object manager CPU 45 which respectively control the index storage 46 and the object storage 47. The host 40 is connected over the local area network 25 to the FAX server workstation 32 which in turn is connected through the FAX A transponder equipment 34 to the telephone network and is also connected through a second FAX transponder B 35 to the telephone network. The host 40 is also connected by the LAN 25 to the user workstation 38, which is connected in turn to the document scanner 24 and the display 36. Other equipment connected to the LAN 25 includes the scanner workstation 22 which is connected to the document scanner 20 and the printer workstation 28 which is connected to the printer 30. Also an additional user workstation 42 is connected to the LAN 25, and is in turn connected to the display 41.

Figure 1B:
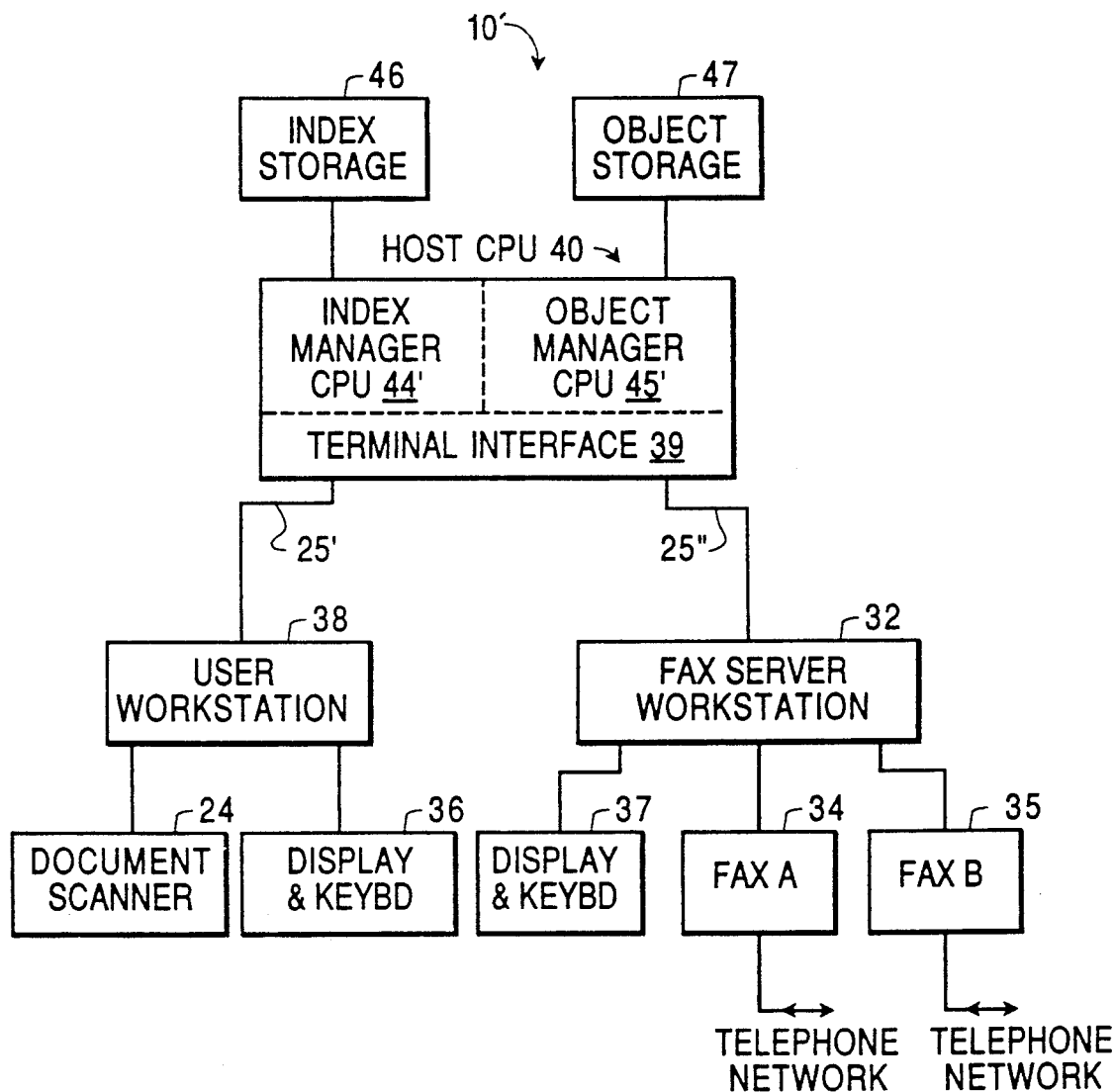
FIG. 1B shows the alternate Image Archiving System 10'.

In FIG. 1B an alternate embodiment is shown for the image archiving system 10', which gives a truer view of the connection of the user workstation 38 over connection 25' to the host CPU 40 and the connection of the FAX server workstation 32 over the connection 25" to host CPU 40. The FAX server workstation is also shown with a display and keyboard 37. The host CPU 40 is a multi-tasking processor in this embodiment with three programs running, a terminal interface 39, an index manager 44' which interfaces with the index storage 46, and an object manager 45' which interfaces with the object storage 47. In both of the system embodiments of FIG. 1A and FIG. 1B, document objects are stored in the object storage 47 and are accessible through an index stored in the index storage 46. Both of the systems in FIG. 1A and FIG. 1B are host based terminal systems, so that the user workstation 38 and the FAX server workstation 32 operate in a 3270 terminal mode. Since the user workstation 38 and the FAX server workstation 32 are intelligent processor subsystems, they operate in a 3270 emulation mode when exchanging SNA packets between themselves and the host. In a host based 3270 terminal mode of operation, the workstations do not directly communicate with each other, but must relay messages through the terminal interface 39 of the host 40.

FIG. 1C shows the host object storage 47, and in particular shows six MO:DCA envelopes, which will be described in greater detail later. Envelope 48 contains two pages of a document, envelope 50 contains a cover sheet image and a distribution list, envelope 52 contains a cover sheet, envelope 54 contains a cover sheet and two distribution lists, envelope 56 contains a distribution list, and envelope 58 contains a cover sheet and a distribution list.

FIG. 1D is a more detailed view of one of the envelopes 54, including the MO:DCA header 62, the image segment 64, the text segment 66, and the end portion 68 for the MO:DCA envelope.

Figure 1E:
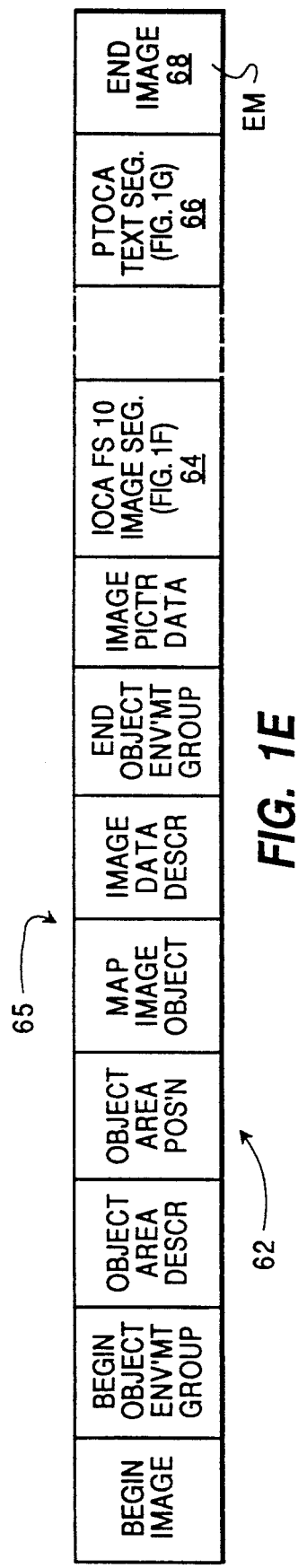
FIG. 1E shows the Image and Distribution Lists for FAX in MO:DCA Envelope.

FIG. 1E gives a still more detailed view of the MO:DCA-P envelope 65 which includes the header 62, the image segment 64, the text segment 66 and the end portion 68.

Figure 1F:
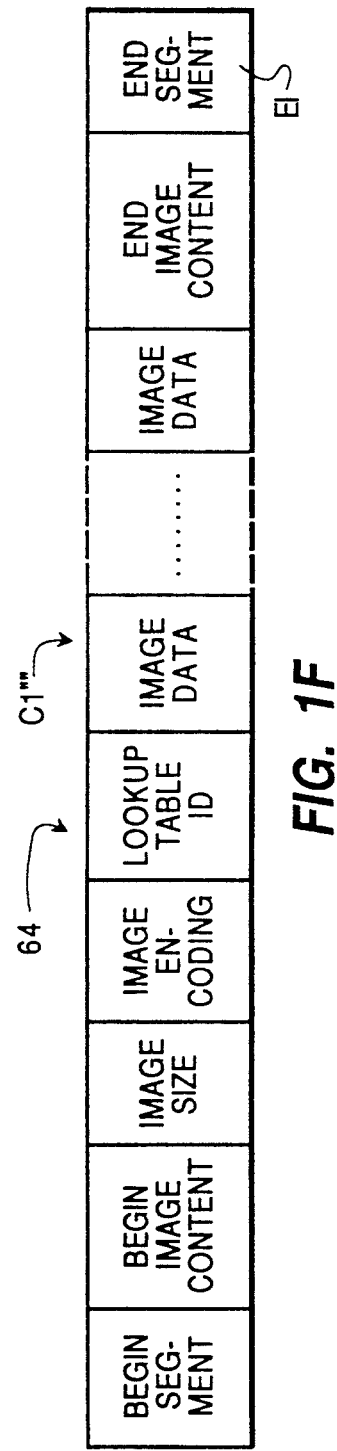
FIG. 1F shows the IOCA FS 10 Image Segment 64.
Figure 1G:
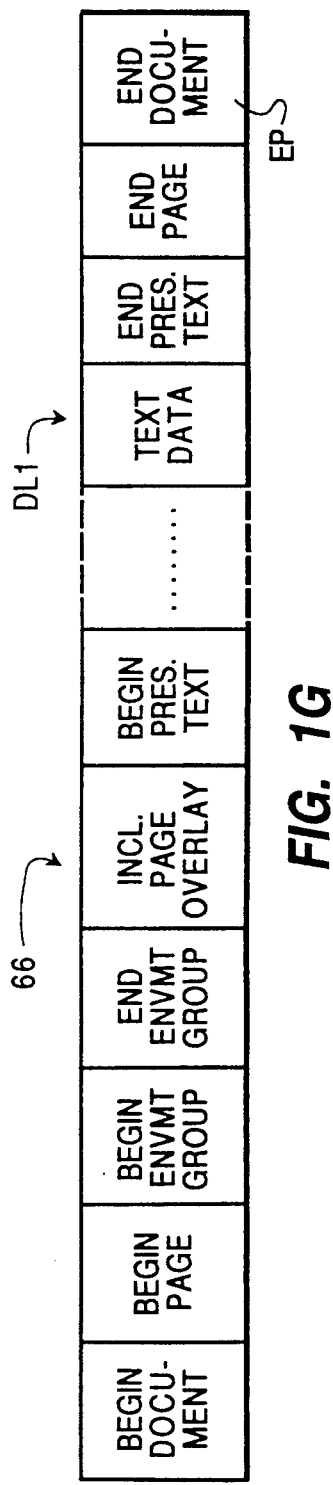
FIG. 1G shows the PTOCA Text Segment 66.

FIG. 1F gives a more detailed view of an IOCA segment 64. FIG. 1G gives a more detailed view of a PTOCA text segment 66.

FIG. 1H gives a more detailed view of an SNA packet 75, which contains the SNA header 55 which includes the document descriptor field 60. The SNA packet is defined by the header 55 and the trailer 70. Within the SNA packet 75, is the MO:DCA header 62, the image segment 64, the text segment 66, the end MO:DCA 68, all of which are shown as the MO:DCA-P portion 65.

FIG. 1Ia illustrates the prior art use of the document descriptor field 60 in the SNA header. Its prior art use is for a 40 character alphanumeric string which may be optionally printed as a title on hard copy printout to facilitate manual handling. FIG. 1Ib shows that in the prior art, the document descriptor 60 is a spare field which is usually empty, when the SNA packet is used for non-printing operations such as transmitting an enclosed data object to the host for storage or transmitting an enclosed data object from the host to a workstation.

Figure 1L:
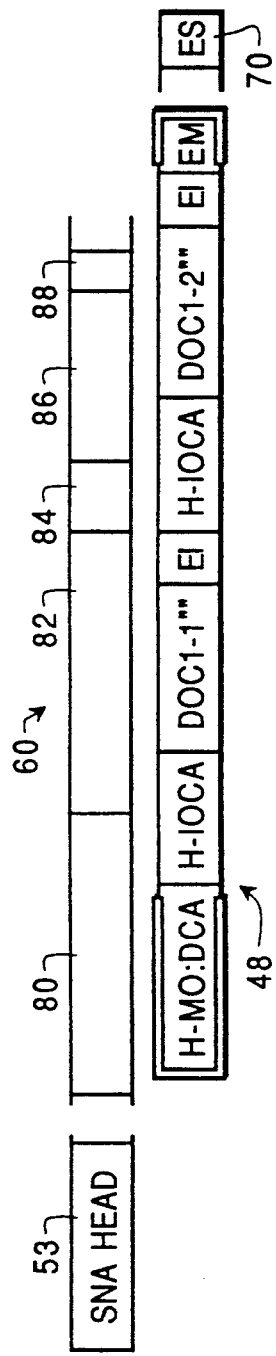
FIG. 1L shows the Document Descriptor Data Field 60 to Access New Distribution List (ID=A) from Host to Send to FAX Workstation.
Figure 1L:
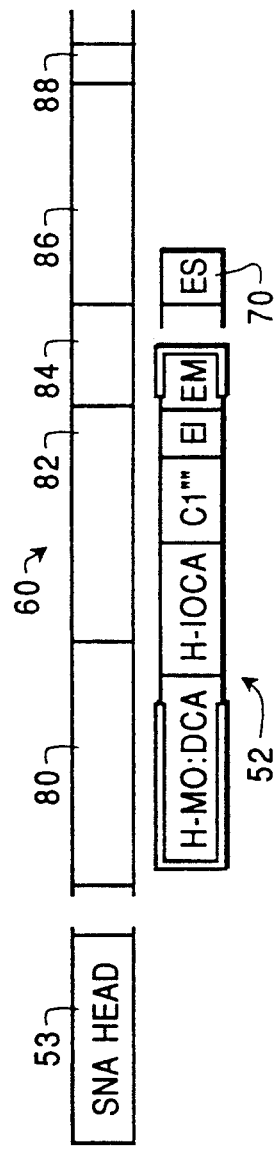
Figure 1L:
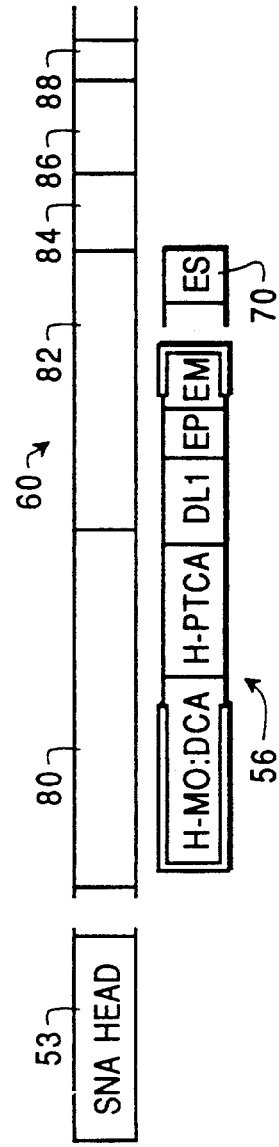
Figure 1J:
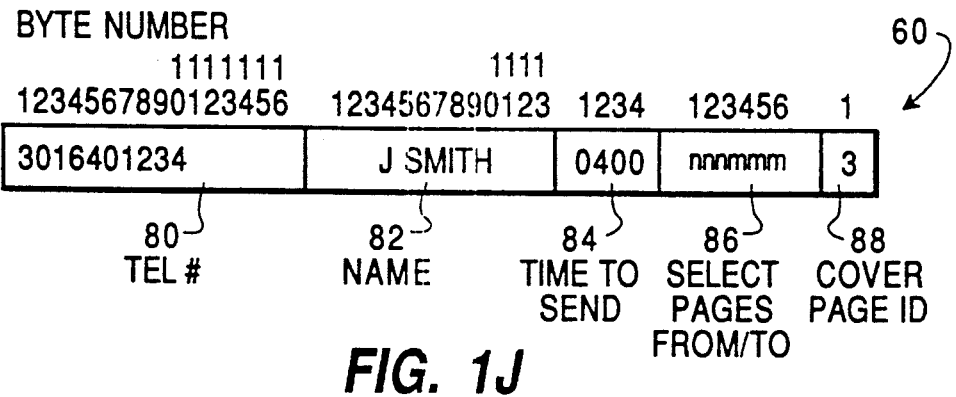
FIG. 1J shows the Document Descriptor Data Field 60 to access Document Doc1 from Host to Send to FAX Workstation for Transmission with Cover Sheet (ID=3) for Single Specific FAX Addressee.

FIG. 1J illustrates one feature of the invention, which is the use of a document descriptor field 60 to transfer information from a user workstation 38 to the FAX server workstation 32 to carry out FAX server operations. The document descriptor field 60 shown in FIG. 1J is divided into a telephone number portion 80, an addressee name portion 82, a time to send portion 84, a select pages portion 86 and a cover page ID portion 88.

Figure 2A:
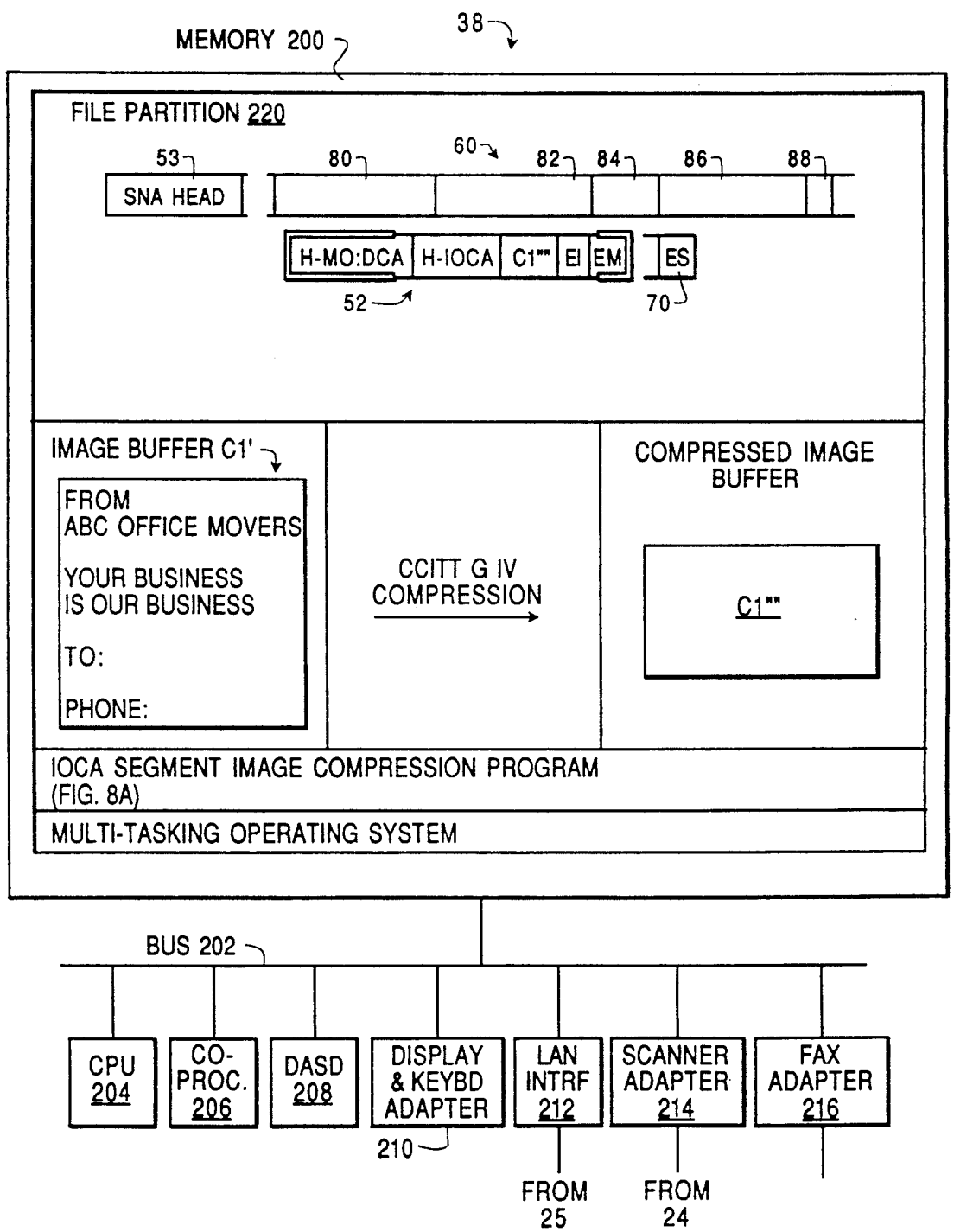
FIG. 2A shows the User Workstation in the Image System Scan in and Compress a Cover Page Image for Transmission to Host as New Cover Sheet.

An example of an intelligent processor used as the user workstation 38, is shown in FIG. 2A. The user workstation 38 includes the memory 200 which is connected by means of the bus 202 to the CPU 204, an optional co-processor 206, a DASD 208, a display and keyboard adapter 210, a local area network interface 212 which is connected to the LAN 25, a scanner adapter 214 which is connected to the scanner 24, and optionally a FAX adapter 216. The memory 200 includes a file partition 220 in which SNA packets, MO:DCA envelopes, and image and text objects are buffered.

Figure 3:
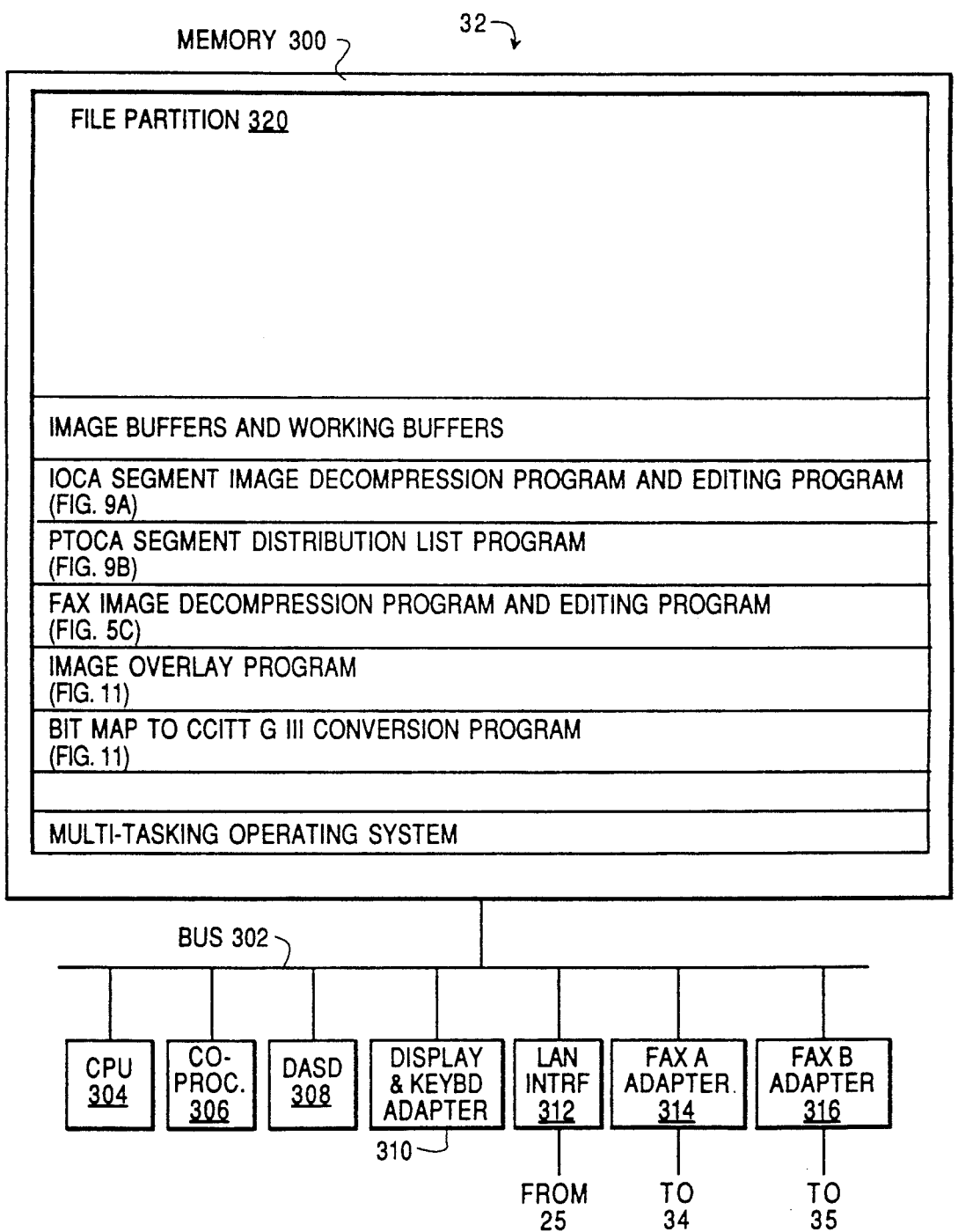
FIG. 3 shows the FAX Workstation in the Image System with Multi-Tasked Applications.

FIG. 3 shows an example of an intelligent processor used as the FAX server workstation 32. The FAX workstation 32 includes the memory 300 which is connected by means of the bus 302 to the CPU 304, an optional co-processor 306, a DASD 308, a display and keyboard adapter 310, a local area network interface 312 connected to the LAN 25, a first FAX adapter FAX A 314 connected to the first FAX transponder 34, and a second FAX adapter FAX B 316 which is connected to the FAX transponder 35. The memory 300 includes the file partition 320 which buffers SNA packets, MO:DCA envelopes and text and image objects. Both the user workstation 38 and the FAX server workstation 32 employ multi-tasking operating systems to enable them to run several application programs in overlapped execution to perform the various functions described in the following sections.

One of the features of the invention is the provision of system-wide data stream compatibility by the concealment of FAX cover sheet and distribution list object handling information which is uniquely required by the FAX workstation 32, in an otherwise unneeded document descriptor field 60 located outside of the data stream boundary, in the distribution service or session header.

In the IBM ImagePlus document image system, shown in FIG. 1A and FIG. 1B, image objects and text objects are IOCA and PTOCA objects, respectively, as shown in FIGS. 1D, 1E, 1F and 1G. Every workstation, host 40, printer, scanner, transmission device and storage device is designed to operate in the system with IOCA and PTOCA objects contained in a MO:DCA envelope, using their common existing format. The MO:DCA envelope forms the data stream which is encapsulated in an SNA packet for accessing, distributing or interchanging the documents in a message service such as the SNA/Distribution Service (SNA/DS) or which is encapsulated in an SNA packet for a transaction session and conversation service such as the SNA Logical Unit Type 6.2 (SNA/LU6.2) service, as shown in FIG. 1H. Both the SNA/DS and the SNA/LU6.2 services encapsulate the MO:DCA data stream between an SNA header 55 and an SNA trailer. The SNA header includes a document descriptor field 60 which is intended to hold an alphanumeric string label for optional printing on the cover or in the margin of hard copies of the document, to facilitate manual sorting and handling of the hard copy. When the host 40 receives an incoming SNA packet with a command to the host 40 to output a MO:DCA envelope from the host 40 storage 47, the host 40 removes the document descriptor field 60 from the incoming packet and appends it as the document descriptor field 60 in the new SNA packet which it uses to encapsulate the MO:DCA envelope which it outputs.

In accordance with the invention, FAX cover sheet and distribution list object handling information and addressee information which are uniquely required by the FAX workstation 32, are concealed in the document descriptor field 60 of the SNA header 55. This enables all other devices in the image system to handle the IOCA and PTOCA objects contained in the data stream, in their normal manner, since they ignore the contents of the document descriptor field 60.

Figure 1K:
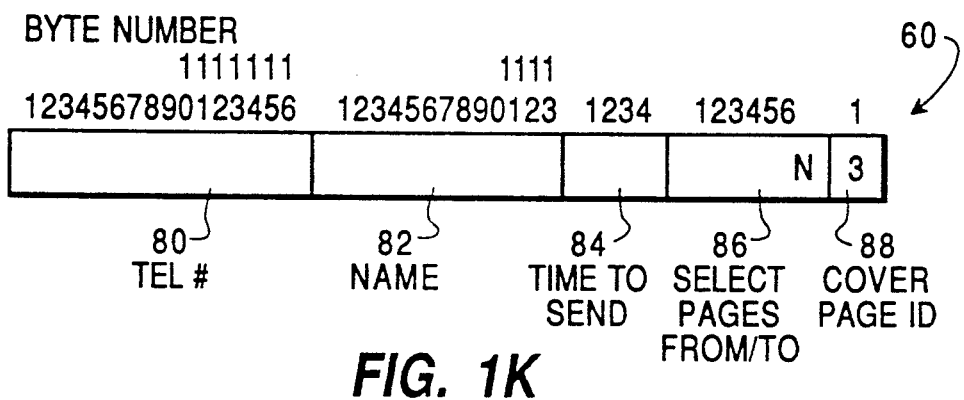
FIG. 1K shows the Document Descriptor Data Field 60 to Access New Cover Sheet (ID=3) from Host to Send to FAX Workstation.
Figure 1L:
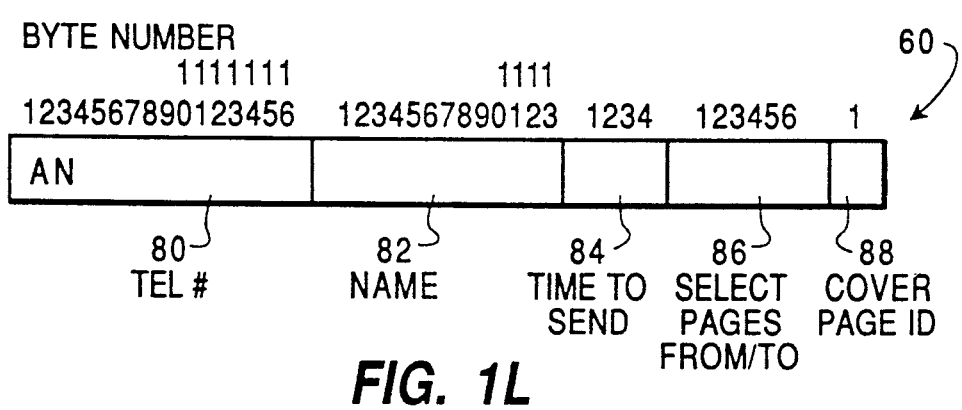
Figure 1M:
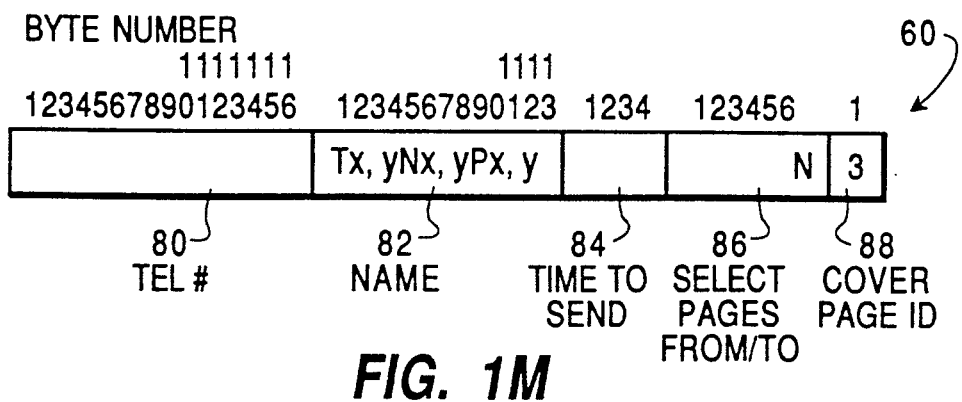
FIG. 1M shows the Document Descriptor Data Field 60 to Access New Cover Sheet (ID=3) from Host to Send to FAX Workstation with Format Control Data CF1 in Name Field 82.
Figure 1N:
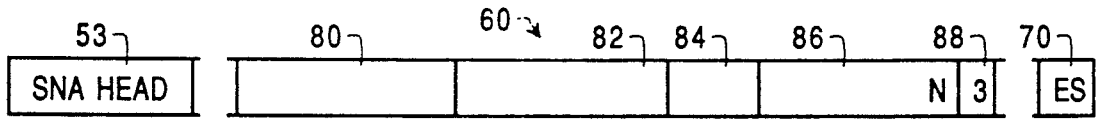
FIG. 1Na shows the SNA Packet Sent from User Workstation to Host with Document Descriptor Data Field 60 to Access New Cover Sheet (ID=3) from Host to Send to FAX Workstation.
Figure 1N:
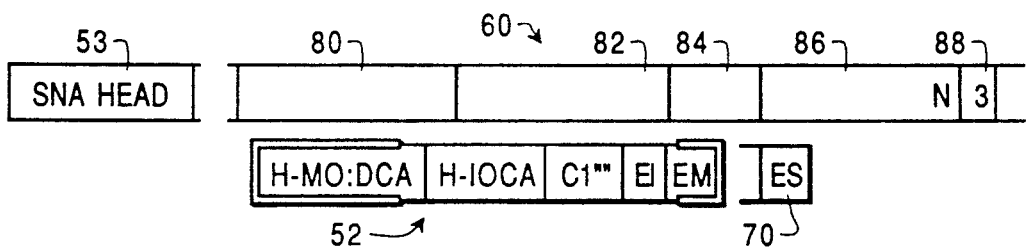
Figure 1P:
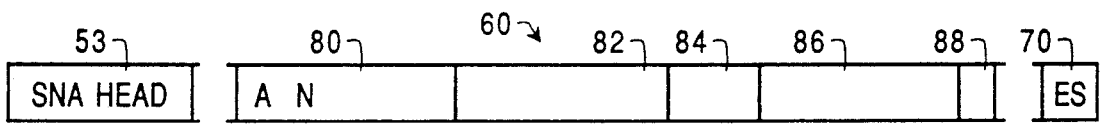
FIG. 1Pa shows the SNA Packet Sent from User Workstation to Host with Document Descriptor Data Field 60 to Access New Distribution List (ID=A) from Host to Send to FAX Workstation.
Figure 1P:
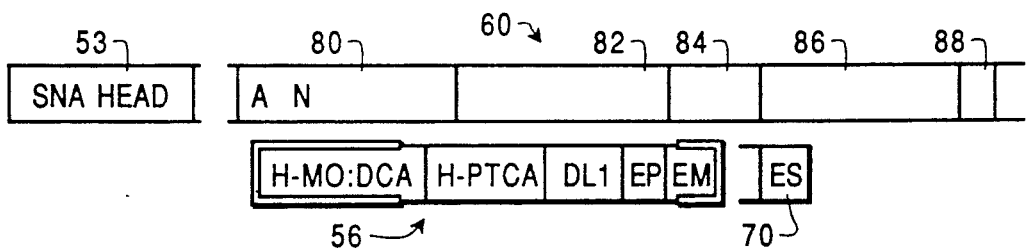
Figure 1Q:
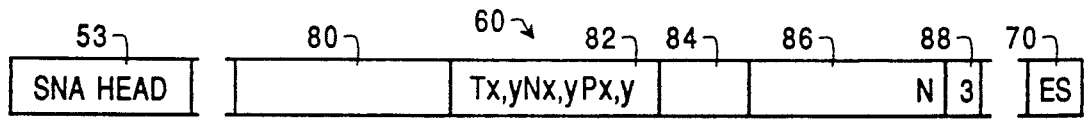
FIG. 1Qa shows the SNA Packet Sent from User Workstation to Host with Document Descriptor Data Field 60 to Access New Cover Sheet (ID=3) from Host to Send to FAX Workstation with Format Control Data CF1 in Name Field 82.
Figure 1Q:
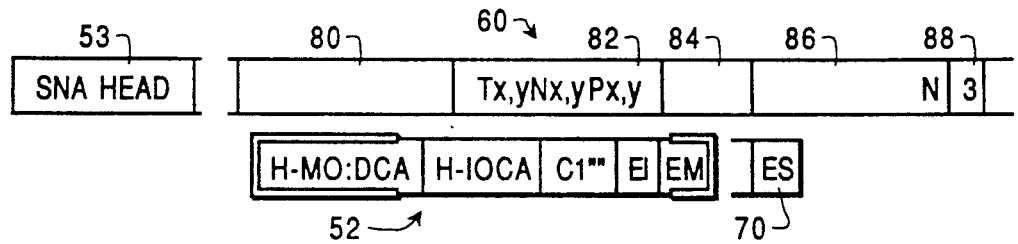
Figure 1R:
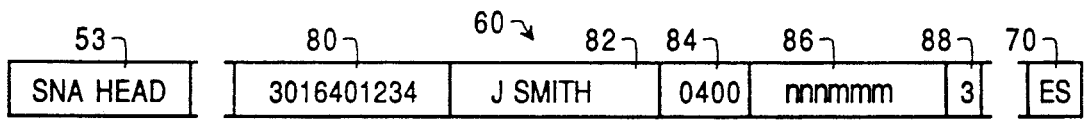
FIG. 1R*a* shows the SNA Packet Sent from User Workstation to Host with Document Descriptor Data Field 60 to access Document Doc1 from Host to Send to FAX Workstation for Transmission with Cover Sheet (ID=3) (stored at FAX Workstation) for Single Specific FAX Addressee.
Figure 1R:
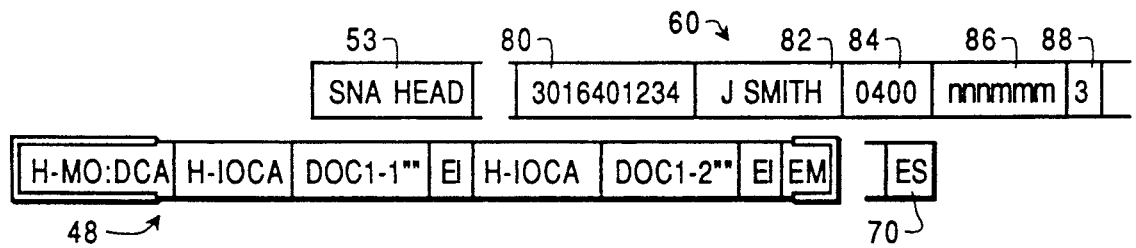

Specifically, in accordance with the invention, the document descriptor field in the SNA header 55 is used to hold addressee information which is to be used by the FAX workstation 32 for transmitting a document by FAX to a single named addressee, as shown in FIG. 1R*b*. The field is used to hold the phone number and name of the addressee, the time to start sending the transmission, the range of pages for the document to be sent and the selection of a particular one of several cover sheets which are stored at the FAX workstation. The SNA packet encapsulates a MO:DCA envelope which contains the IOCA objects for the images of the pages of the document which is to be transmitted by FAX to the addressee.

Figure 6A:
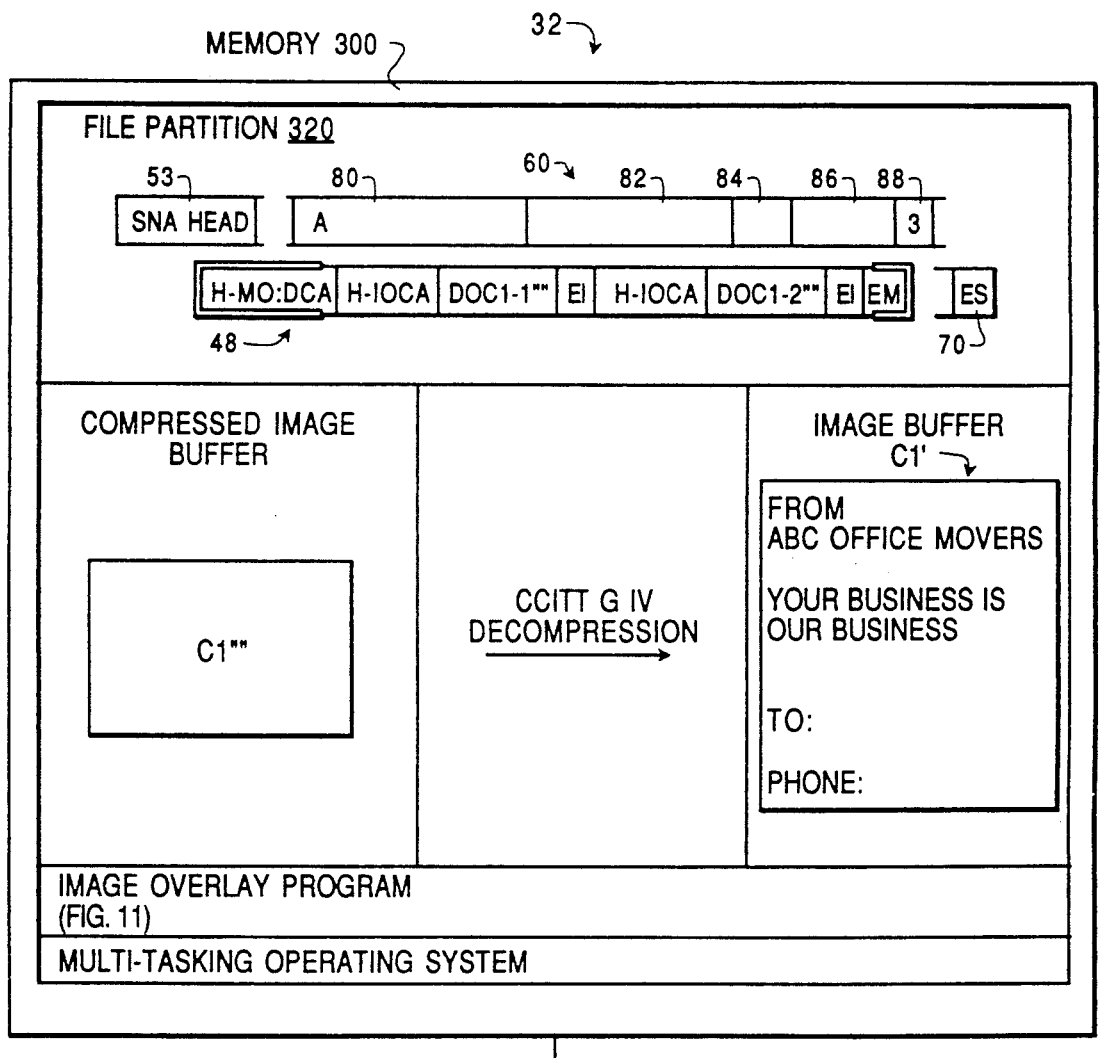
FIG. 6A shows the FAX Workstation Access Compressed Cover Sheet C1"" From DASD, Decompress Using CCITT G 4 into Image C1' of Cover sheet and Buffer in Bit Plane.
Figure 6B:
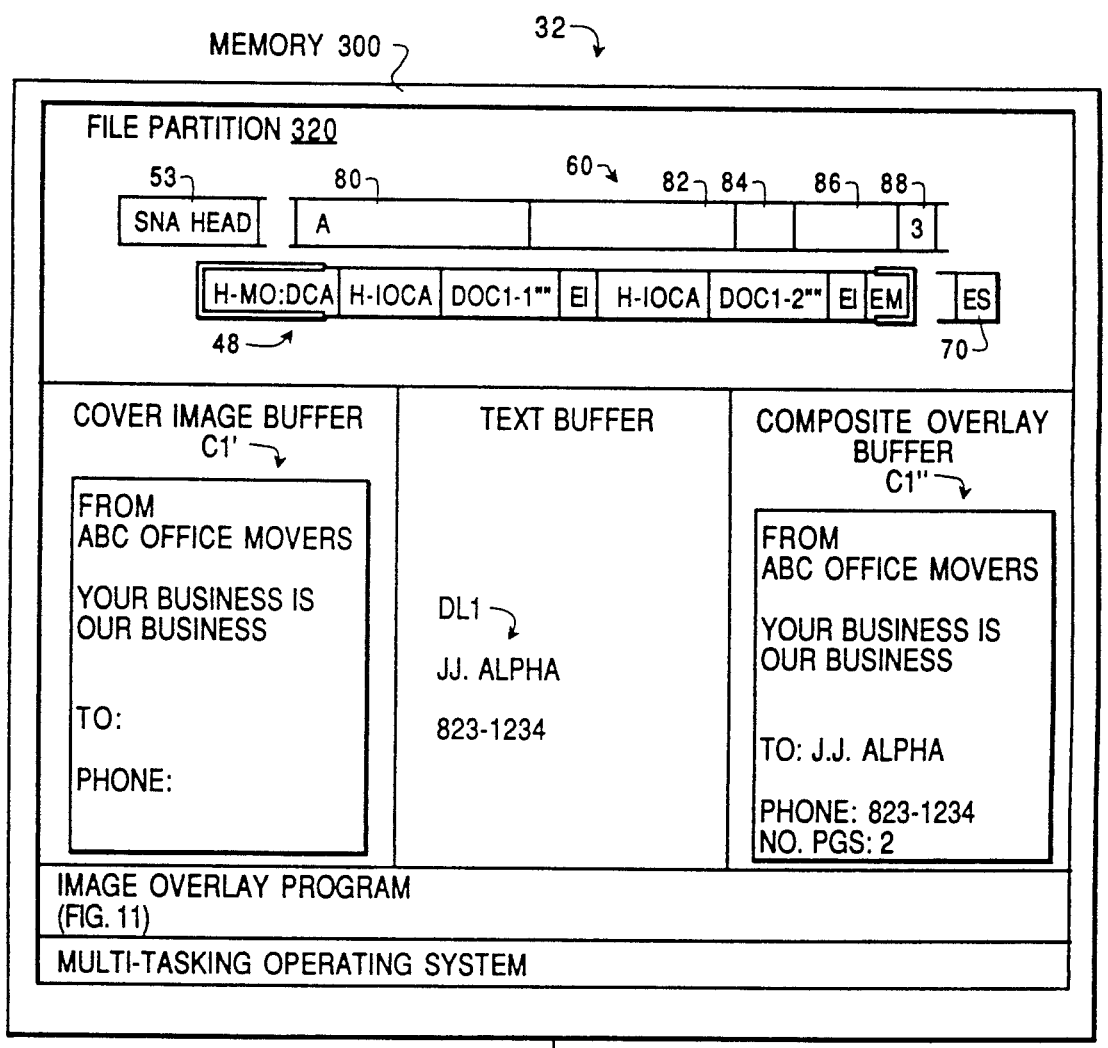
FIG. 6B shows the FAX Workstation Construction of the Cover Image/Text Composite.
Figure 7A:
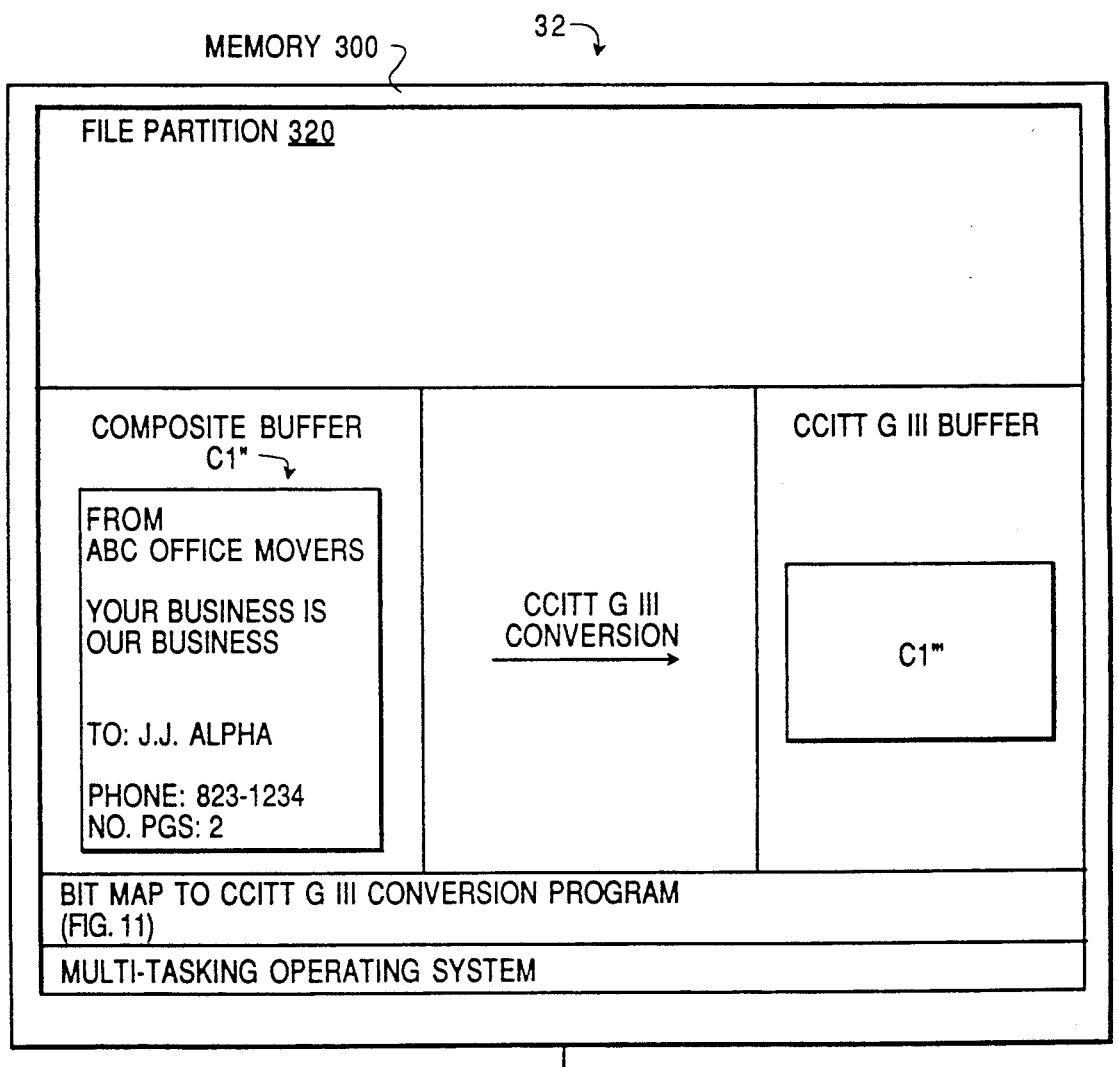
FIG. 7A shows the FAX Workstation Convert the Cover to CCITT G III for FAX Transmission.

Further in accordance with the invention, when a cover sheet image stored on the DASD 308 at the FAX workstation 32 is being prepared by the FAX workstation for transmission, as shown in FIGS. 6A and 6B, the image of the cover sheet is placed in a first bit plane buffer. Then the alphanumeric text representing the addressee information in the document descriptor field 60 undergoes a character image generation step to produce the image of the characters, which are then placed in a second bit plane buffer at locations whose coordinates are derived from text formatting data associated with the cover sheet image. Then the FAX workstation 32 performs a logical OR operation of the first and second bit planes, forming a composite cover sheet image with the addressee text thereon, which is placed in a third bit plane. The composite cover sheet image is then converted into a FAX transmission block format, as shown in FIG. 7A. The addressee's telephone number from the document descriptor field 60 is then output to a telephone dialing component of the FAX transmission equipment to initiate call placement. When the telephone call placement has been successfully made, the composite cover sheet FAX transmission block is output to the FAX transmission equipment, followed by the document pages to be transmitted.

Figure 4A:
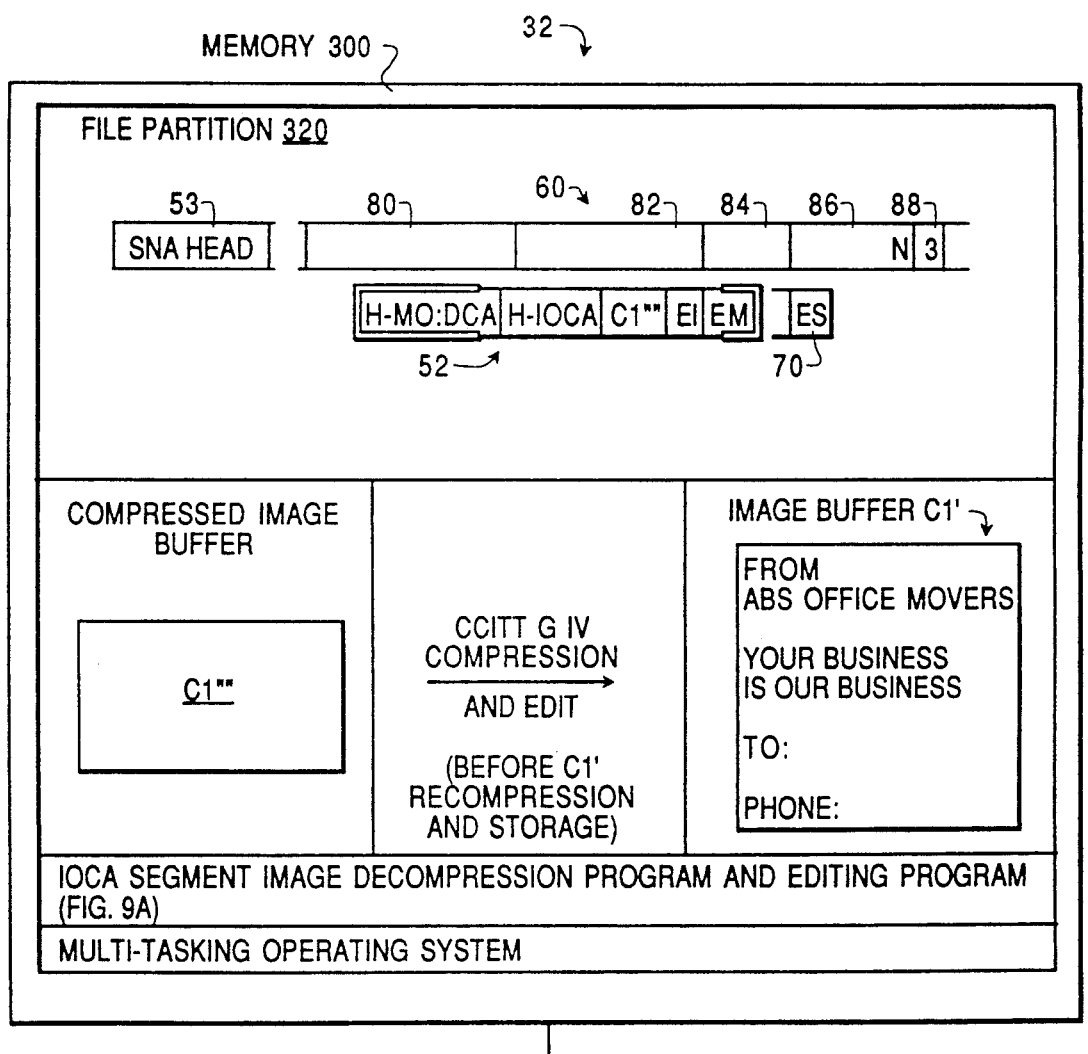
FIG. 4A shows the FAX Workstation in the Image System Download a New Cover Image and Edit Before Storage on Workstation DASD.
Figure 4B:
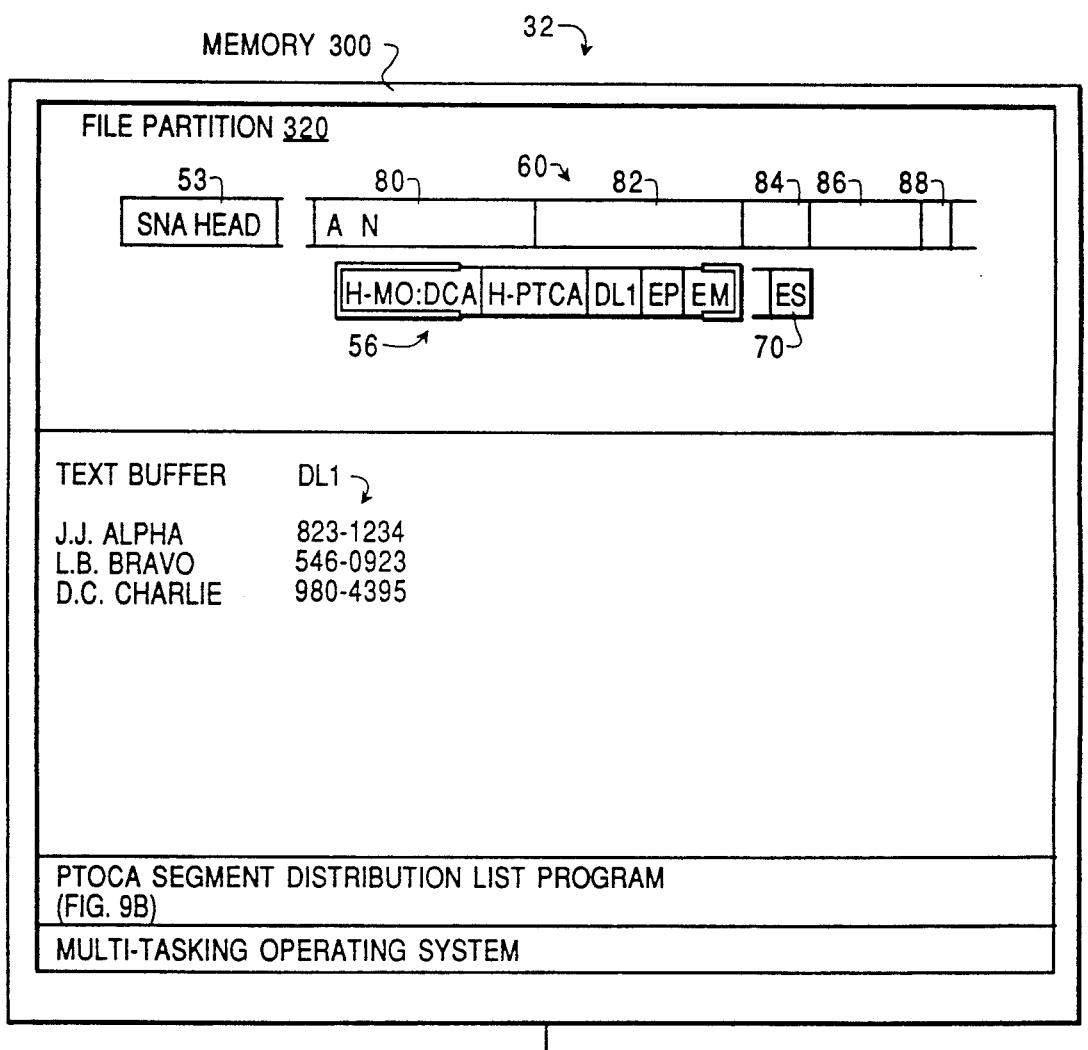
FIG. 4B shows the FAX Workstation in the Image System Download a New Distribution List and Store on workstation DASD.
Figure 4C:
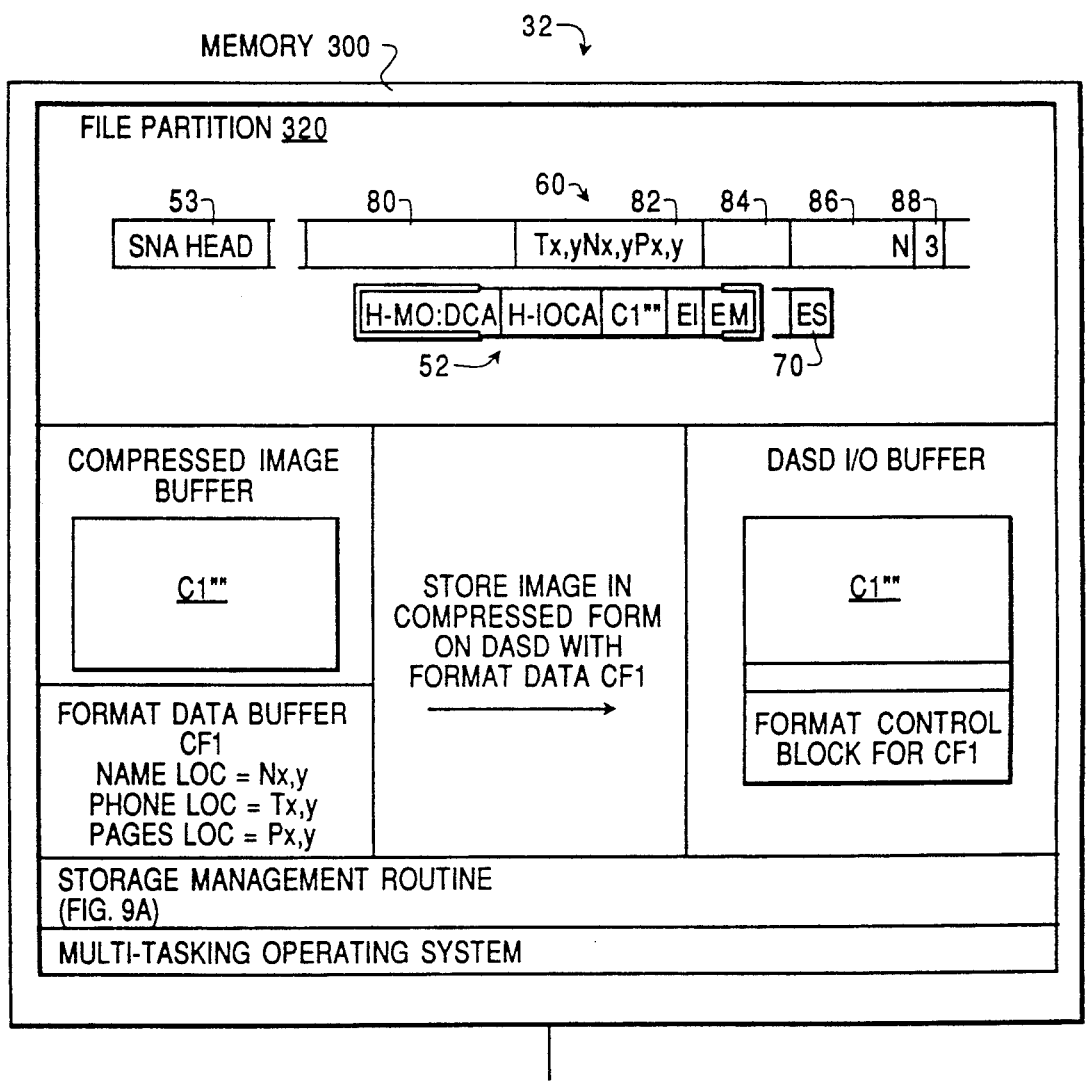
FIG. 4C shows the FAX Workstation in the Image System Download a New Cover Image With Format Data to Store on workstation DASD.

New cover sheets are provided to the FAX workstation 32 in the form of IOCA image objects in a MO:DCA envelope which has the same external appearance as any other MO:DCA envelope in the image system, as shown in FIGS. 4A and 4C. In accordance with the invention, the document descriptor field 60 in the SNA header is used to hold the control information which distinguishes the object as a new cover sheet image and provides its identity. The FAX workstation handles the new cover sheet image differently from other document images. If the document descriptor field 60 also contains text formatting information for the location of addressee data to be overlaid on the image, as shown in FIG. 4C, then the new cover sheet image is stored on the DASD 308 in the FAX workstation 32 in association with the text format data, ready to use for FAX transmissions. Alternately, if the document descriptor field 60 does not contain the text formatting information, as shown in FIG. 4A, then FAX workstation 32 enables an editing function, allowing an operator to enter the coordinates for the location of the addressee text to be overlaid onto the cover sheet. If the operator at the FAX workstation 32 desires to alter the appearance of the graphical information on the cover sheet, or if the operator wishes to display an image of the cover sheet, then the FAX workstation 32 decompresses the compressed image of the cover sheet to enable an operator at the workstation to perform these tasks. Thereafter, the edited cover sheet image is recompressed and stored, along with the overlay text format data, on the DASD 308 at the workstation.

Figure 5A:
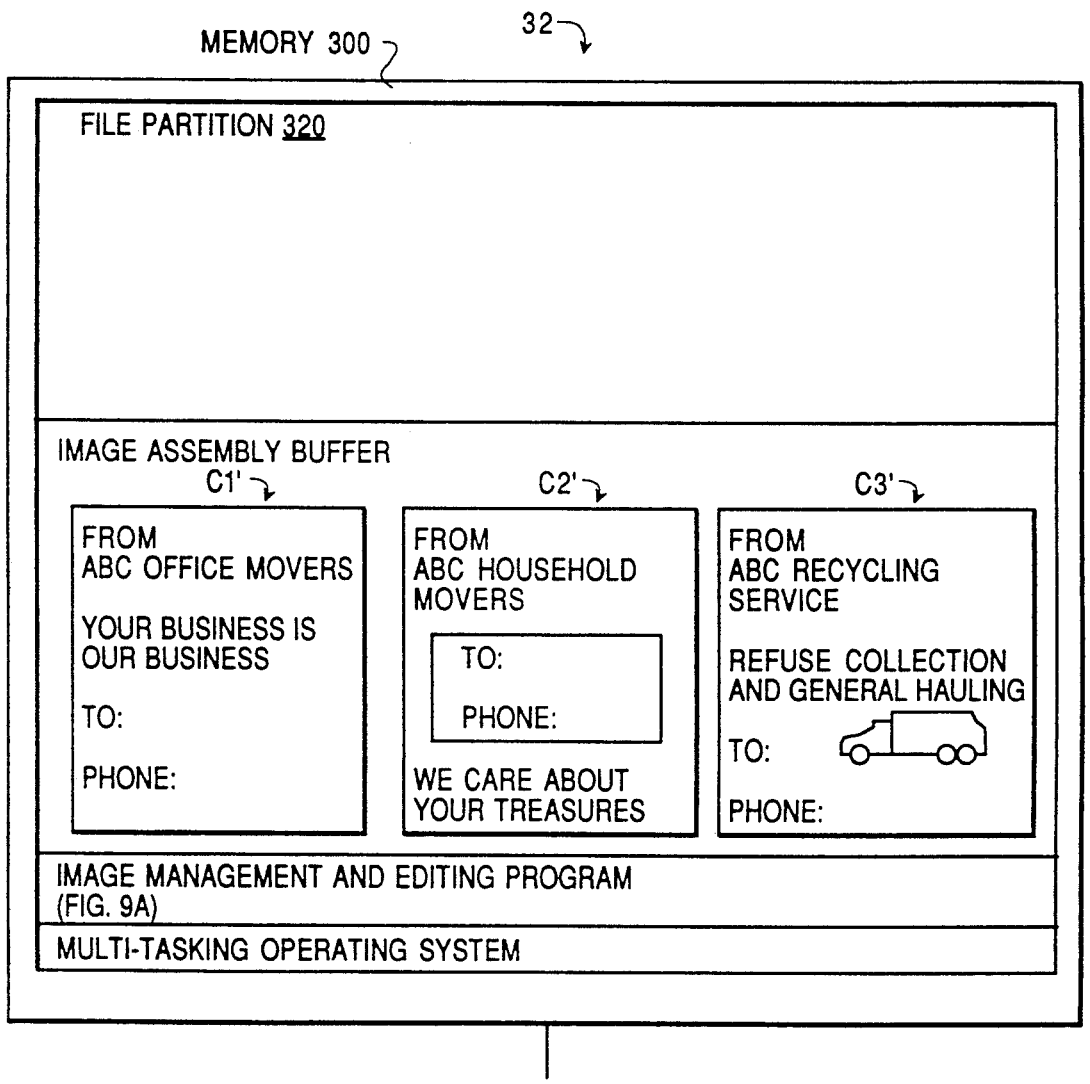
FIG. 5A shows the FAX Workstation Assemble Cover Sheets, Formats and Distribution Lists for Storage in workstation DASD.
Figure 5B:
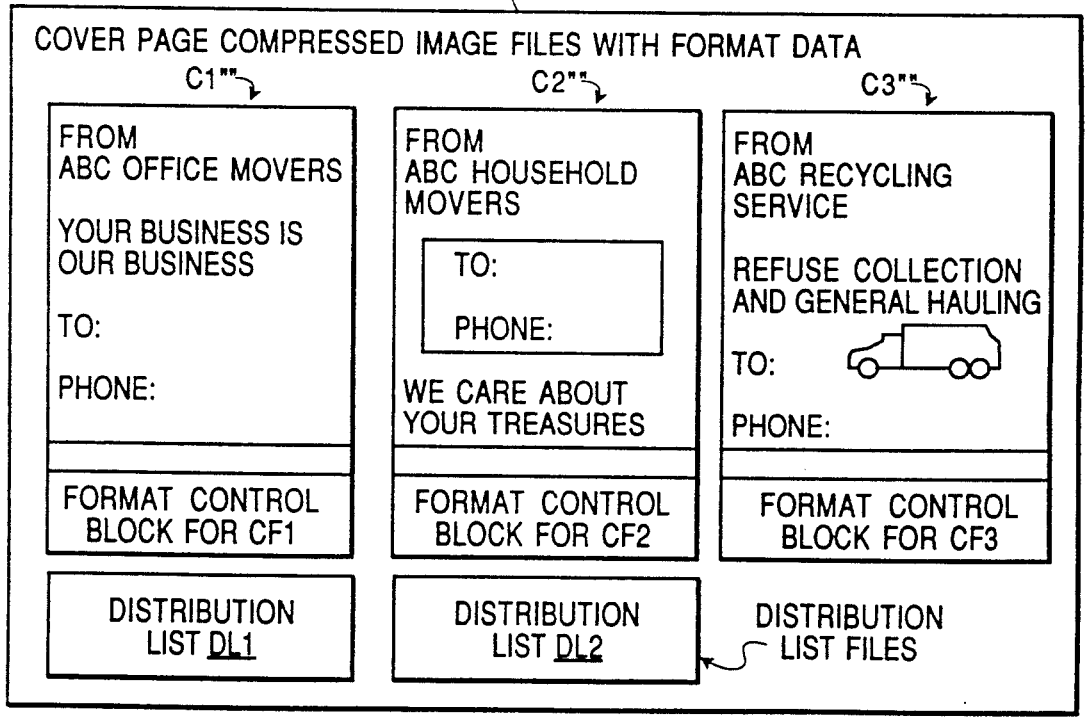
FIG. 5B shows the FAX workstation DASD Storage of Cover Page Bit Map Images, Format Control Blocks and Distribution Lists.

In accordance with the invention, a plurality of cover sheet images and their associated overlay text are stored on the DASD 308 in the FAX workstation, as shown in FIGS. 5A and 5B, to enable users throughout the image system to use customized cover sheets of their own personal design. Each user in the image system has the ability to scan in a hard copy of a customized cover sheet at his workstation, as shown in FIG. 2A and each user also has the opportunity to employ a graphics editor at his workstation in the image system to create customized cover sheet images. These cover sheet images are then compressed and inserted into IOCA image objects at the user workstation and the IOCA object is placed in a MO:DCA envelope which has the same external appearance at that of any other MO:DCA envelope in the image system.

Figure 2B:
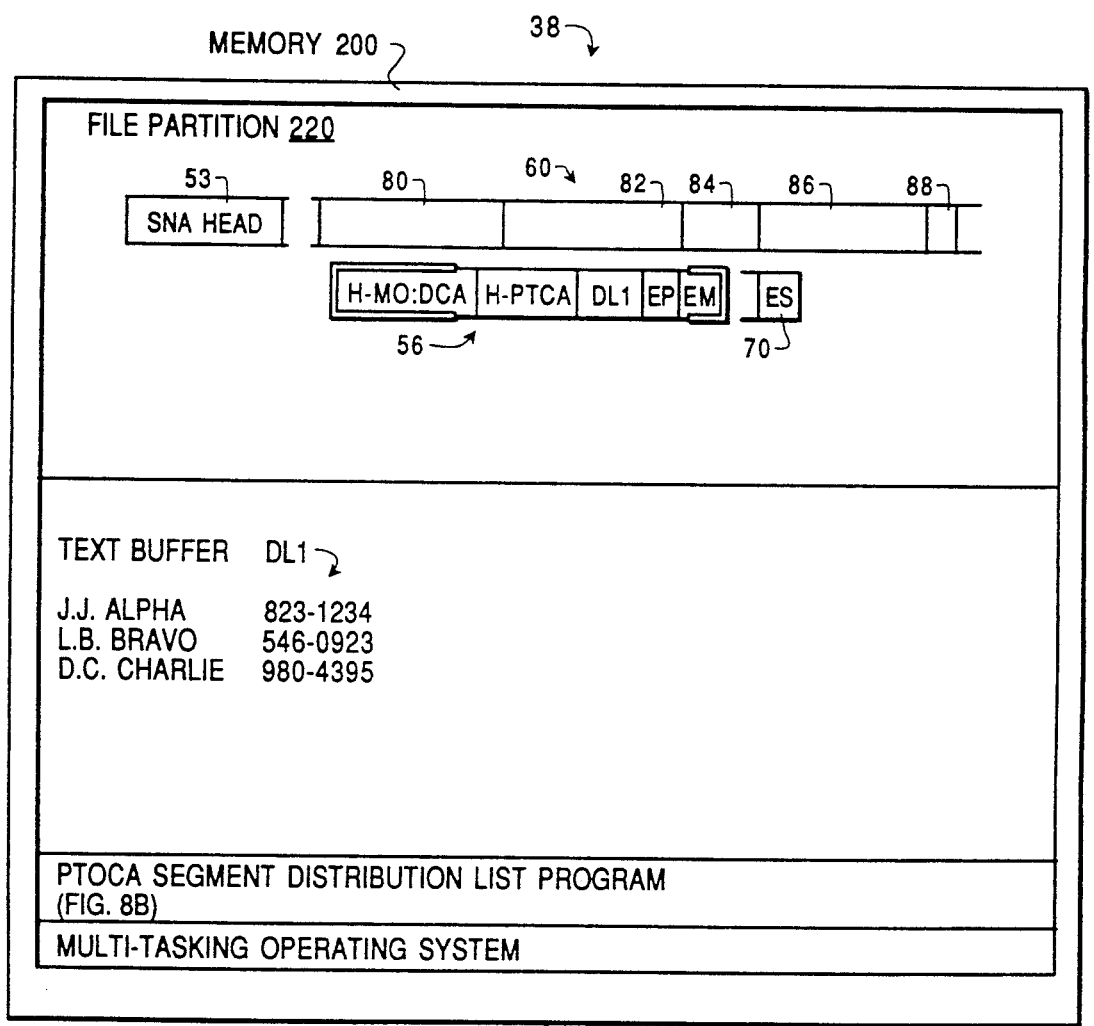
FIG. 2B shows the User Workstation in the Image System Prepare a New Distribution List for Transmission to Host.
Figure 2C:
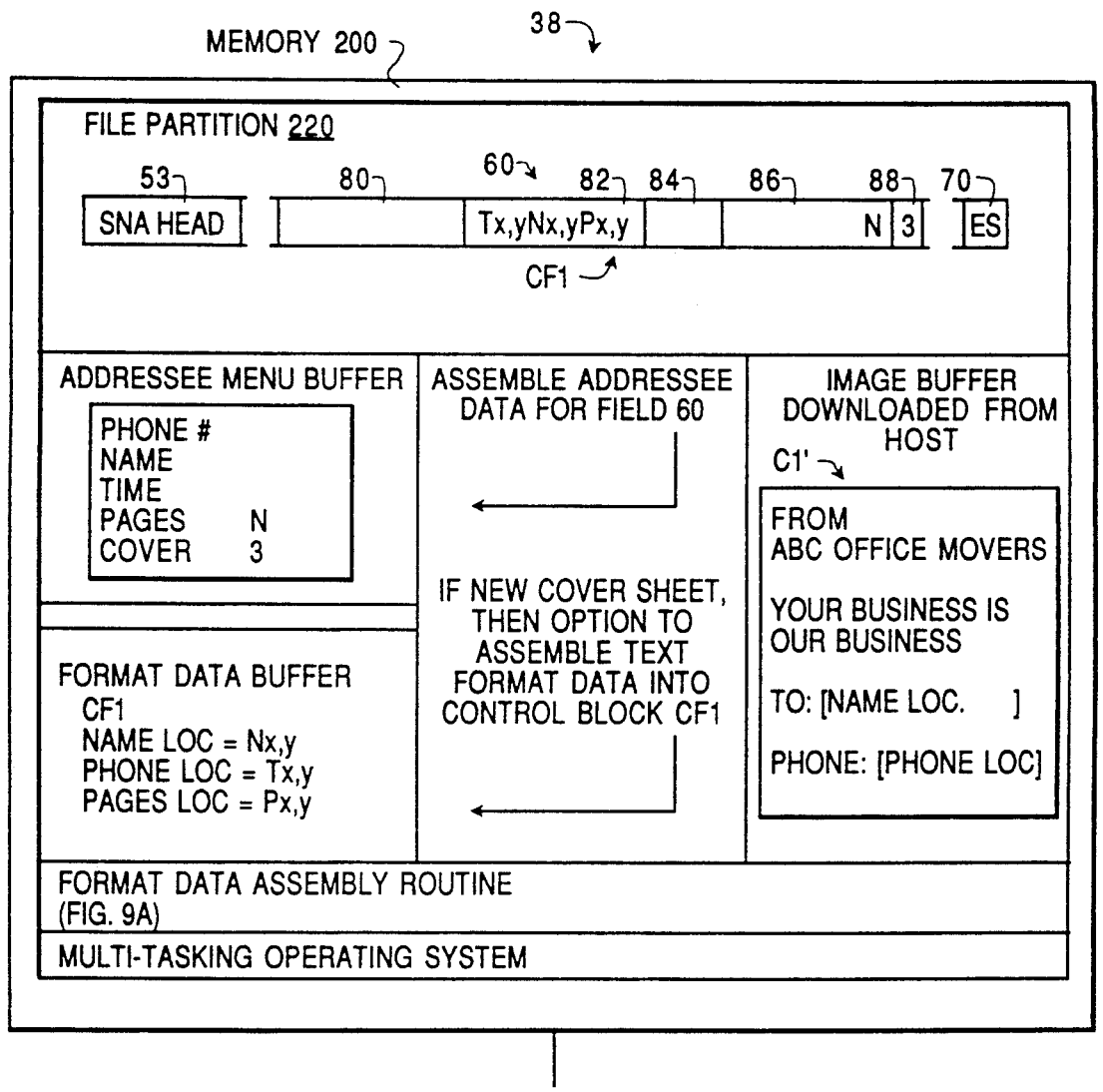
FIG. 2C shows the User Workstation in the Image System Prepare a Request to Host to Access New Cover Sheet (ID=3) and Forward it to FAX Workstation for Storage. Option is Available to Include Text Formatting Data Along with Request to Host, the Data to be Forwarded to FAX Workstation.

The user can then transmit the MO:DCA envelope containing the new cover sheet to the host 40 for storage on the host 40 object storage 47, as shown in FIG. 1C. Since the new cover sheet image is to be stored at the host 40 like any other MO:DCA object in the system, the document descriptor field 60 in the SNA packet containing the MO:DCA envelope is left blank. Later, if the user wishes to download the new cover sheet image from the host 40 to the FAX workstation 32, the command sent from the user workstation 38 to the host 40, as shown in FIG. 2C, is with an SNA packet whose document descriptor field 60 includes the information that the MO:DCA envelope contained therein is a new cover sheet having a specified identity. This MO:DCA envelope is then processed as a new cover sheet at the FAX workstation 32, as previously described.

Figure 5C:
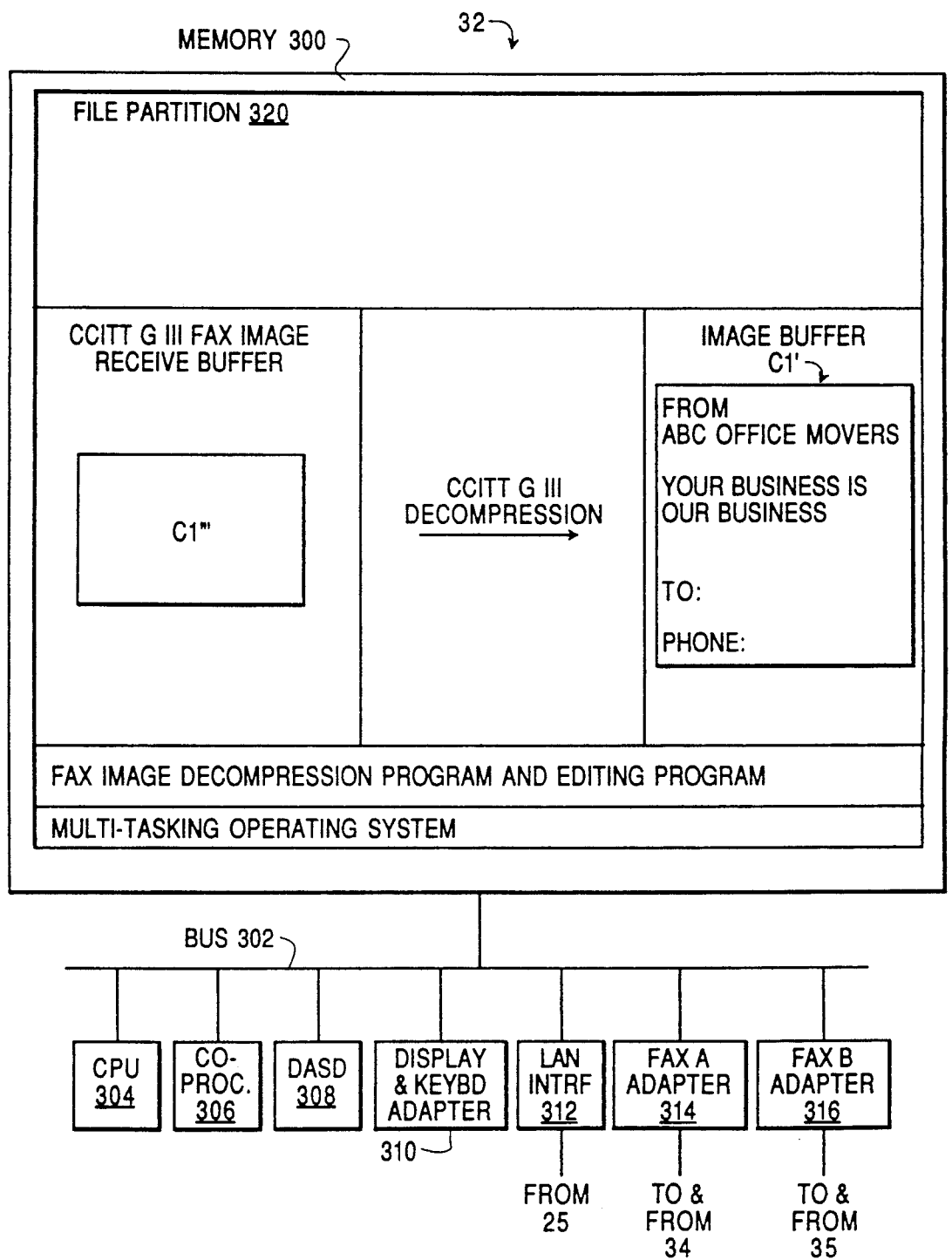
FIG. 5C shows the FAX Workstation FAX in Cover Sheets at the FAX Workstation and Edit Images to Create Format Data for Storage on Workstation DASD.

Alternately, new cover sheet images can be sent to the FAX workstation 32 over the telephone network and FAX equipment connected to the FAX workstation, as shown in FIG. 5C. The incoming FAX transmission block received at the FAX workstation is converted into a bit plane image which may be edited by the operator at the FAX workstation 32 to generate text formatting data for the overlay text. Then the bit plane image of the new cover sheet is compressed and is stored on the DASD 308 at the FAX workstation 32 under an accessible name and in association with the text formatting data.

Further, in accordance with the invention, previously stored cover sheet images at the FAX workstation 32 can be accessed from the DASD 308, decompressed and re-edited to alter the graphical appearance or the text format. The edited image can then be recompressed and stored back on the DASD 308, in association with new text formatting information, where desired. Since the formatting of the location for the text overlays onto the cover sheets is done by defining the coordinates for the location of the text, the editing of the text format can be done without decompressing the image of the cover sheet.

Addressee distribution lists can also be stored in the FAX workstation 32, each containing a customized list of addressee names and telephone numbers. Specifically, in accordance with the invention, the document descriptor field 60 in the SNA header 55 is used to hold distribution list information which is to be used by the FAX workstation 32 for transmitting a document by FAX to several addressees who are named in the distribution list, as shown in FIGS. 6A and 6B. The phone number field of the document descriptor field is used to contain an alpha character name which designates the specific distribution list which is stored on the DASD 308 at the FAX workstation. The the time to start sending the transmission, the range of pages for the document to be sent and the selection of a particular one of several cover sheets which are stored at the FAX workstation 32, can also be provided. The SNA packet encapsulates a MO:DCA envelope which contains the IOCA objects for the images of the pages of the document which is to be transmitted by FAX to the addressees named in the distribution list.

Figure 7B:
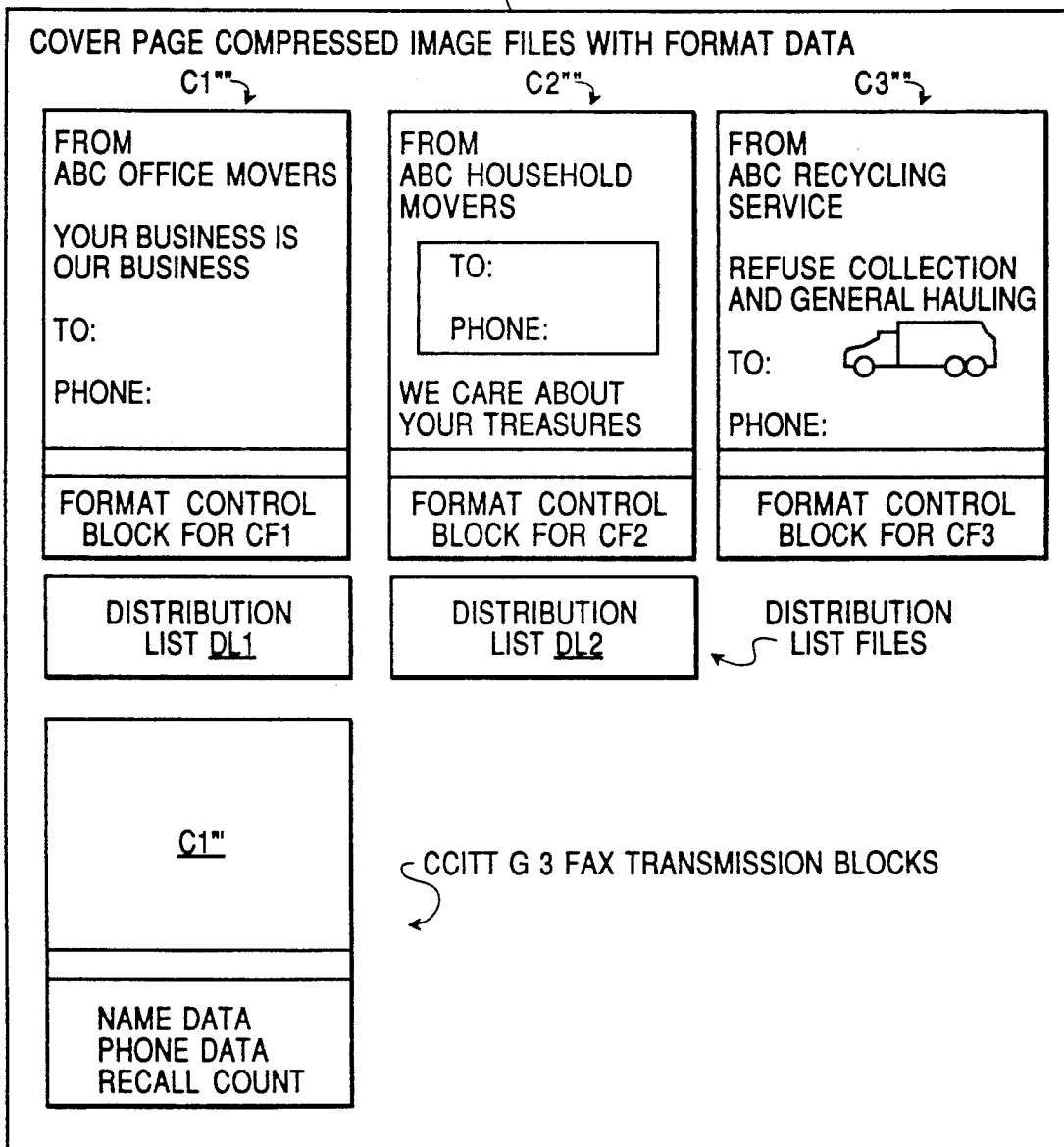
FIG. 7B shows the FAX workstation DASD Storage of CCITT G 3 FAX Transmission Blocks of Composite Cover Sheets for Calls which Were Incomplete.

Further in accordance with the invention, when the FAX workstation 32 receives a MO:DCA envelope containing a document to be transmitted, accompanied by a document descriptor field 60 in the SNA header 55 specifying a particular distribution list, the FAX workstation 32 prepares the FAX transmission blocks for the document pages to be sent. Then it accesses the designated cover sheet and its associated text formatting data from the DASD 308 and places its image in the first bit plane buffer, as shown in FIGS. 6A and 6B. Then the FAX workstation 32 starts a loop, each cycle of which will process the FAX transmission of the cover sheet and document pages to a consecutive one of the several addressees in the distribution list. Each line in the distribution list contains the telephone number and the name of one addressee. For each line, the alphanumeric text representing the addressee name and phone number undergoes a character image generation step to produce the image of the characters, which are then placed in a second bit plane buffer at locations whose coordinates are derived from text formatting data associated with the cover sheet image. Then the FAX workstation 32 performs a logical OR operation of the first and second bit planes, forming a composite cover sheet image with the addressee text thereon, which is placed in a third bit plane. The composite cover sheet image is then converted into a FAX transmission block format, as shown in FIG. 7A. The addressee's telephone number from the distribution list is then output to a telephone dialing component of the FAX transmission equipment to initiate call placement. When the telephone call placement has been successfully made, the composite cover sheet FAX transmission block is output to the FAX transmission equipment, followed by the document pages to be transmitted. The loop then cycles to the next line of the distribution for a repetition of the process, until all of the addressees in the list have been called. If a particular call is not successfully completed, its incomplete status is logged to the DASD 308. Further in accordance with the invention, the FAX transmission block for the composite cover sheet to have been sent in a failed call attempt, is stored on the DASD 308 in association with other addressee data so that the FAX transmission block does not have to be reconstructed when retry attempts are subsequently made, as shown in FIG. 7B. After calls have been attempted for all of the addressees on the list, the log of incomplete calls is accessed and those incomplete calls are retried. After several retries, if a particular addressee's transmission cannot be completed, the trials are terminated and the failure is reported to the operator of the FAX workstation 32.

New Distribution Lists are provided to the FAX workstation 32 in the form of PTOCA text objects in a MO:DCA envelope which has the same external appearance as any other MO:DCA envelope in the image system, as shown in FIG. 4B. In accordance with the invention, the document descriptor field 60 in the SNA header is used to hold the control information which distinguishes the object as a new distribution list and provides its identity. The FAX workstation handles the new distribution list differently from other documents. The new distribution list is stored on the DASD 308 in the FAX workstation ready to use for FAX transmissions, accessible by its name.

In accordance with the invention, a plurality of cover distribution lists are stored on the DASD 308 in the FAX workstation 32, to enable users throughout the image system to use customized distribution lists of their own personal design, as shown in FIG. 5B. Each user in the image system has the ability to enter a customized distribution list at his workstation. The distribution list is inserted into a PTOCA text object at the user workstation and the PTOCA object is placed in a MO:DCA envelope which has the same external appearance at that of any other MO:DCA envelope in the image system, as shown in FIG. 2B. The user can then transmit the MO:DCA envelope containing the new distribution list to the host 40 for storage on the host 40 object storage 47, as shown in FIG. 1C. Since the new distribution list is to be stored at the host 40 like any other MO:DCA object in the system, the document descriptor field 60 in the SNA packet containing the MO:DCA envelope is left blank. Later, if the user wishes to download the new distribution list from the host 40 to the FAX workstation 32, the command sent from the user workstation 38 to the host 40 is with an SNA packet whose document descriptor field 60 includes the information that the MO:DCA envelope contained therein is a new distribution list having a specified identity, as shown in FIG. 4B. This MO:DCA envelope is then processed as a new distribution list at the FAX workstation 32, as previously described.

Figure 8A:
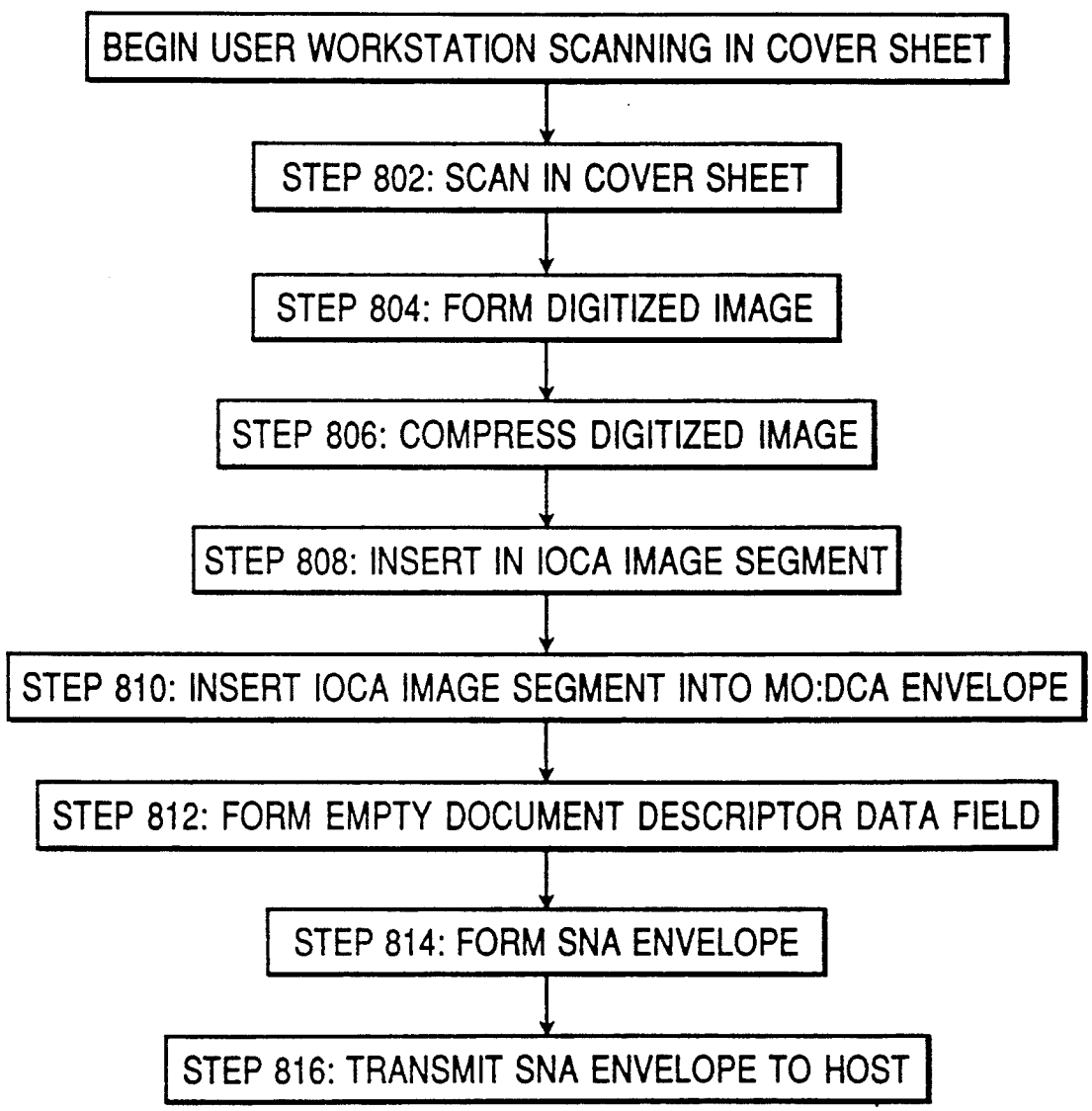
FIG. 8A shows the Flow Diagram for User Workstation Scanning In a Cover Sheet.

FIG. 8A—Shows the Flow Diagram for User Workstation Scanning In a Cover Sheet. The steps of the method are as follows.

Step 802: Scan in Cover Sheet C1 at User Workstation 38.

Step 804: Form Digitized Image C1' of Cover Sheet (FIG. 2A).

Step 806: Compress Digitized Image C1' into Compressed Cover Sheet C1'''' Using CCITT Group IV Compression Algorithm.

Step 808: Insert Compressed Cover Sheet C1'''' in IOCA Image Segment 64.

Step 810: Insert IOCA Image Segment 64 into MO:DCA Envelope 52.

Step 812: Form Empty Document Descriptor Data Field 60.

Step 814: Form SNA Envelope 75 with SNA Header 55, Data Field 60, MO:DCA Envelope 52 and SNA Trailer 70 (FIG. 11d).

Step 816: Transmit SNA Envelope 75 to Host for Storage for Storage of MO:DCA Envelope 52 in Object Storage 47 (FIG. 1C).

Figure 8B:
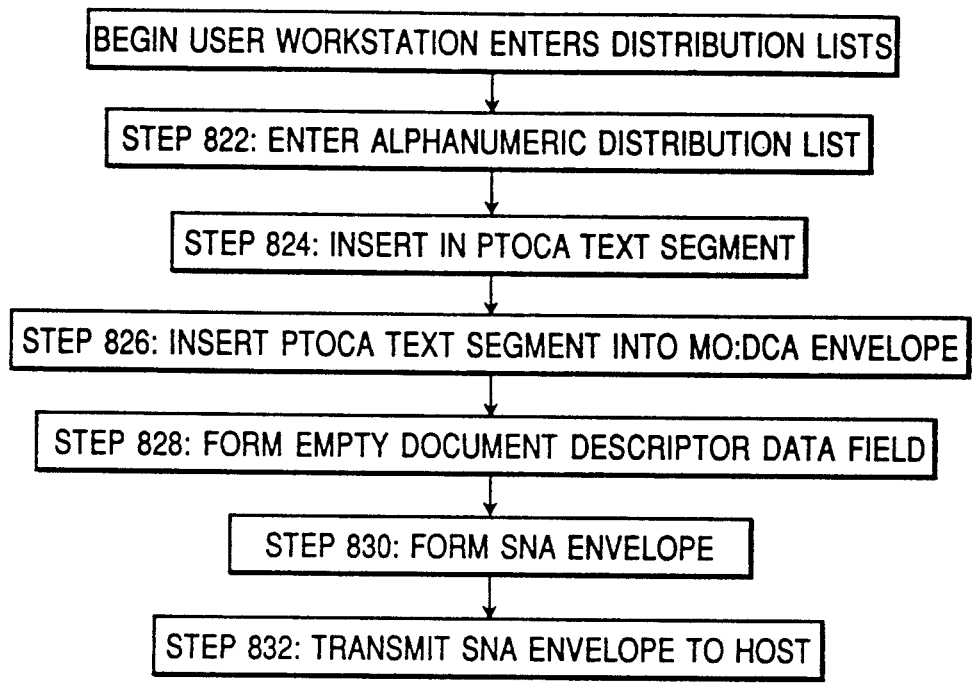
FIG. 8B shows a Flow Diagram for User Workstation Entering Distribution Lists.

FIG. 8B Shows a Flow Diagram for User Workstation Entering

Distribution Lists. The steps of the method are as follows.

Step 822: Enter Alphanumeric Distribution List DL1 as a list of Name & Telephone Number pairs at User Workstation 38 (FIG. 2B).

Step 824: Insert Distribution List DL1 in PTOCA Text Segment 66.

Step 826: Insert PTOCA Text Segment 66 into MO:DCA Envelope 56.

Step 828: Form Empty Document Descriptor Data Field 60.

Step 830: Form SNA Envelope 75 with SNA Header 55, Data Field 60, MO:DCA Envelope 56 and SNA Trailer 70 (FIG. 11e).

Step 832: Transmit SNA Envelope 75 to Host for Storage for Storage of MO:DCA Envelope 56 in Object Storage 47 (FIG. 1C).

Figure 8C:
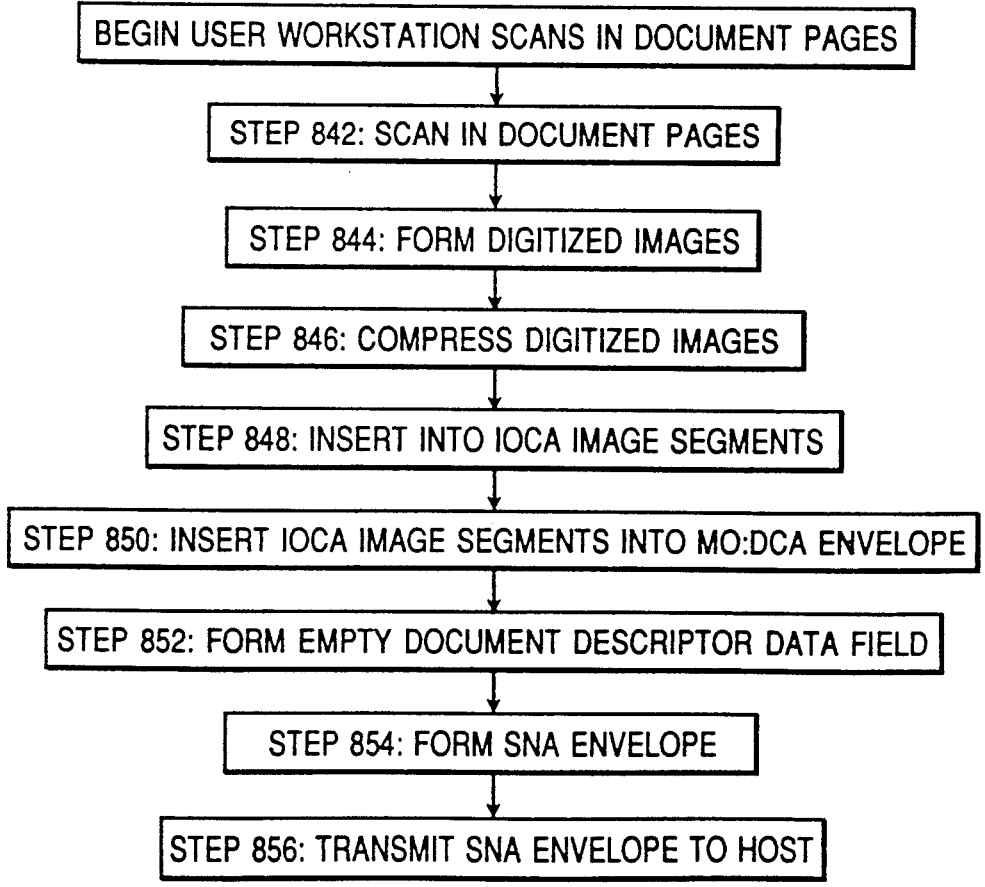
FIG. 8C shows a Flow Diagram for User Workstation Scanning In Document Pages.

FIG. 8C Shows a Flow Diagram for User Workstation Scanning In Document Pages. The steps of the method are as follows.

Step 842: Scan in Document Pages Doc1-1 and Doc1-2 at User Workstation 38.

Step 844: Form Digitized Images Doc1-1' and Doc1-2'.

Step 846: Compress Digitized Images Doc1-1' and Doc1-2' into Compressed Document Pages Doc1-1"" and Doc1-2"" Using CCITT Group IV Compression Algorithm.

Step 848: Insert Compressed Pages Doc1-1"" and Doc1-2"" into two IOCA Image Segments 64.

Step 850: Insert two IOCA Image Segments 64 into MO:DCA Envelope 48.

Step 852: Form Empty Document Descriptor Data Field 60.

Step 854: Form SNA Envelope 75 with SNA Header 55, Data Field 60, MO:DCA Envelope 48 and SNA Trailer 70 (FIG. 11c).

Step 856: Transmit SNA Envelope 75 to Host for Storage of MO:DCA Envelope 48 in Object Storage 47 (FIG. 1C).

Figure 9A:
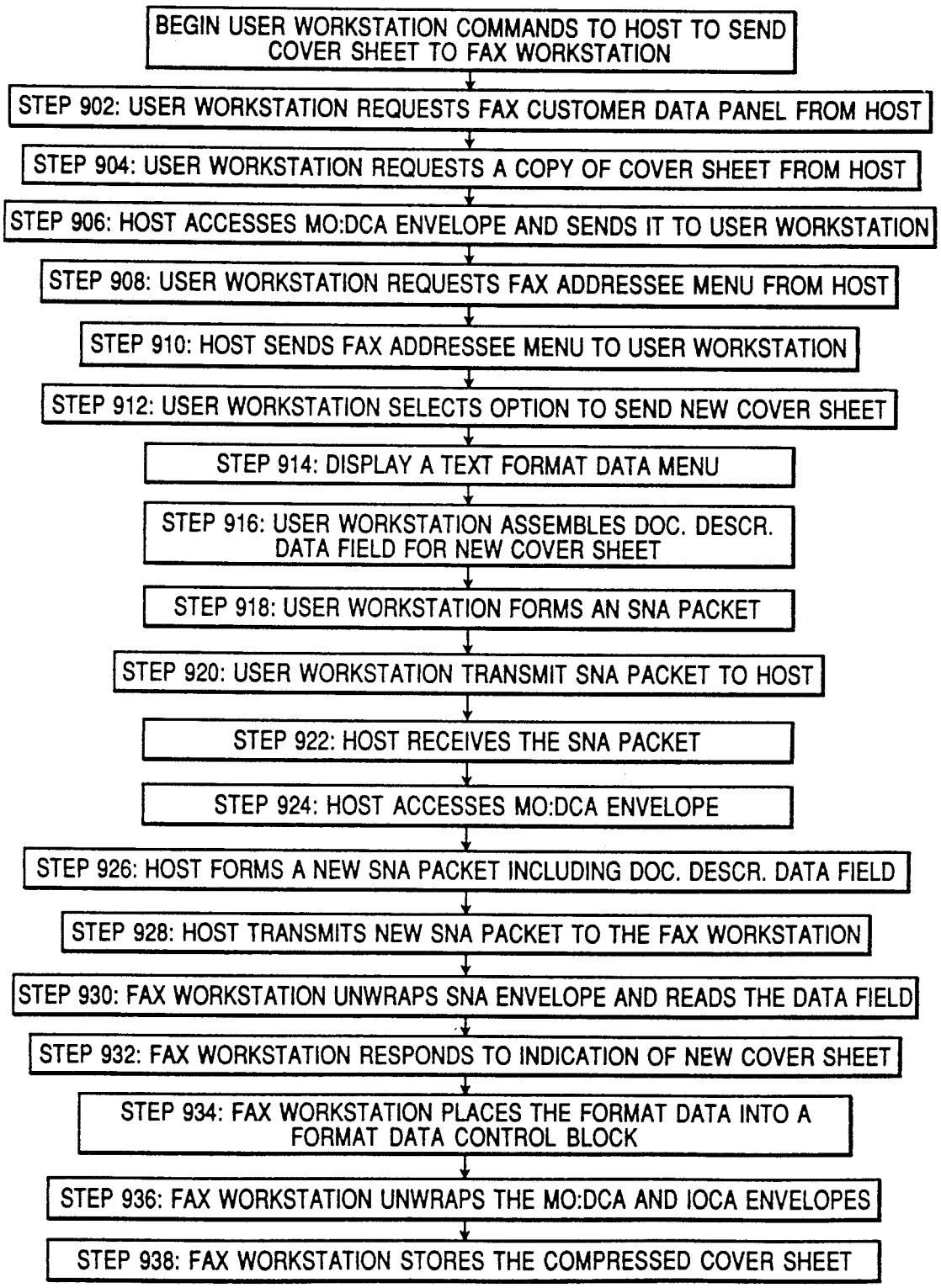
FIG. 9A shows a Flow Diagram of User Workstation Commanding the Host to Send Cover Sheet C1 to FAX Workstation (FIG. 2C).

FIG. 9A Shows a Flow Diagram of User Workstation Commanding the Host to Send Cover Sheet C1 to FAX Workstation (FIG. 2C). The steps of the method are as follows.

Step 902: User workstation requests FAX Customer Data Panel from Host (FIG. 12A).

Step 904: User Workstation requests a copy of Cover Sheet C1 from Host for Viewing using FAX Customer Data Panel.

Step 906: Host Accesses MO:DCA Envelope 52, records its identity and sends it to User Workstation.

Step 908: User Workstation requests FAX Addressee menu from Host (FIG. 12B).

Step 910: Host sends FAX Addressee menu to User Workstation and records that User Workstation will be sending an output command to the Host to send a copy of MO:DCA Envelope 52 to the FAX Workstation.

Step 912: User Workstation selects the FAX Addressee menu option of sending a new cover sheet to the FAX Workstation, Cover Sheet C1 to be identified as "3" (FIG. 2C).

Step 914: If User Workstation selects New Cover Sheet, then the option is available (e.g. by pressing a function key or other action key) to display a Text Format Data Menu (FIG. 12C) which enables the User Workstation to select the location for the placement of the text, using Tx,y for the Phone Number location, Nx,y for the Recipient's Name location, and Px,y for the Page Count location. This format data is assembled into a format control block CF1 which is then inserted into the Name Field 82 of the Document Descriptor Data Field 60.

Step 916: User Workstation assembles Doc. Descr. Data Field 60 for New Cover Sheet with ID=3 and indication that Cover Sheet is New (FIG. 1K and FIG. 1M).

Step 918: User Workstation forms an SNA Packet 75 with SNA Header 55, Doc. Descr. Data Field 60, and SNA Trailer 70 (FIG. 1Na and FIG. 1Qa).

Step 920: User Workstation transmits SNA Packet 75 to Host as the anticipated output command.

Step 922: Host receives the SNA Packet 75 and Extracts the Doc. Descr. Data Field 60 (FIG. 1K and FIG. 1M).

Step 924: Host accesses MO:DCA Envelope 52 from Object Storage 47 (FIG. 1C).

Step 926: Host forms an SNA Packet 75 with SNA Header 55, Data Field 60 (FIG. 1K or FIG. 1M), MO:DCA Envelope 52 and SNA Trailer 70 (FIG. 1Nb or FIG. 1Qb).

Step 928: Host transmits the SNA Packet to the FAX Workstation (FIG. 4A).

Step 930: FAX Workstation unwraps the SNA envelope and reads the Data Field 60.

Step 932: If there is no text formatting data (CF1) in the Data Field 60 (FIG. 1Nb), then the FAX Workstation responds to indication of New Cover Sheet (FIG. 4A) by either selecting a default format or alternately by pausing to enable an operator at the FAX Workstation to input format data CF1 which is placed into a format data control block CF1. The location of the text for the telephone number, name, page count and date can be specified by inputting their coordinates Tx,y, Nx,y, Px,y and Dx,y, respectively. This can be done without decompressing the image, if the coordinates are known or if a default value is to be used. However, if the operator at the FAX Workstation desires to edit the cover sheet image with a graphics editor or if the image needs to be viewed to determine where to place the text, then the compressed image C1"" must be decompressed into the image C1', as is shown in FIG. 4A. After editing, image C1' is recompressed using CCITT G 4 into the compressed image C1"".

Step 934: If there is text formatting data (CF1) in the Data Field 60 (FIG. 1Qb), then the FAX Workstation responds to indication of New Cover Sheet (FIG. 4C) by placing the format data CF1 into the format data control block buffer.

Step 936: FAX Workstation unwraps the MO:DCA and IOCA Envelopes to extract C1"".

Step 938: FAX Workstation, in response to the Data Field 60 indication that this is a new cover sheet, Stores the Compressed Cover sheet C1"" in its DASD, accessible by its ID value of 3, along with the Format Data Control Block CF1 (FIG. 5A and FIG. 5B).

As many as eight different cover sheets C1 through C8, with their associated text format control blocks CF1 through CF8, respectively, can be downloaded from the Host and stored on the FAX workstation, as is shown in FIG. 5A and FIG. 5B. Any of the cover sheets can be selectively accessed and used for individual FAX transmissions or batch mode transmissions with distribution lists. In addition, a default cover sheet is also stored in the FAX Workstation to be used in the event that no particular cover sheet is designated in the Data Field 60.

An alternative way to input a cover sheet image into the FAX Workstation is by receiving a FAX copy of the cover sheet image through the FAX adapter 314 or 316 from the telephone network. FIG. 5C shows that the FAX transmission block C1''' for the cover sheet C1 is buffered in the CCITT G III FAX image receive buffer. It is then decompressed using the CCITT G III algorithm into the image C1' which is buffered in as a bit plane image. The C1' image can then be edited if desired, to generate text format data. The image C1' can then be compressed using the CCITT G 4 algorithm forming the compressed image C1'''', which can be stored on the DASD in association with its text format data control block CF1 (FIG. 5B).

Figure 9B:
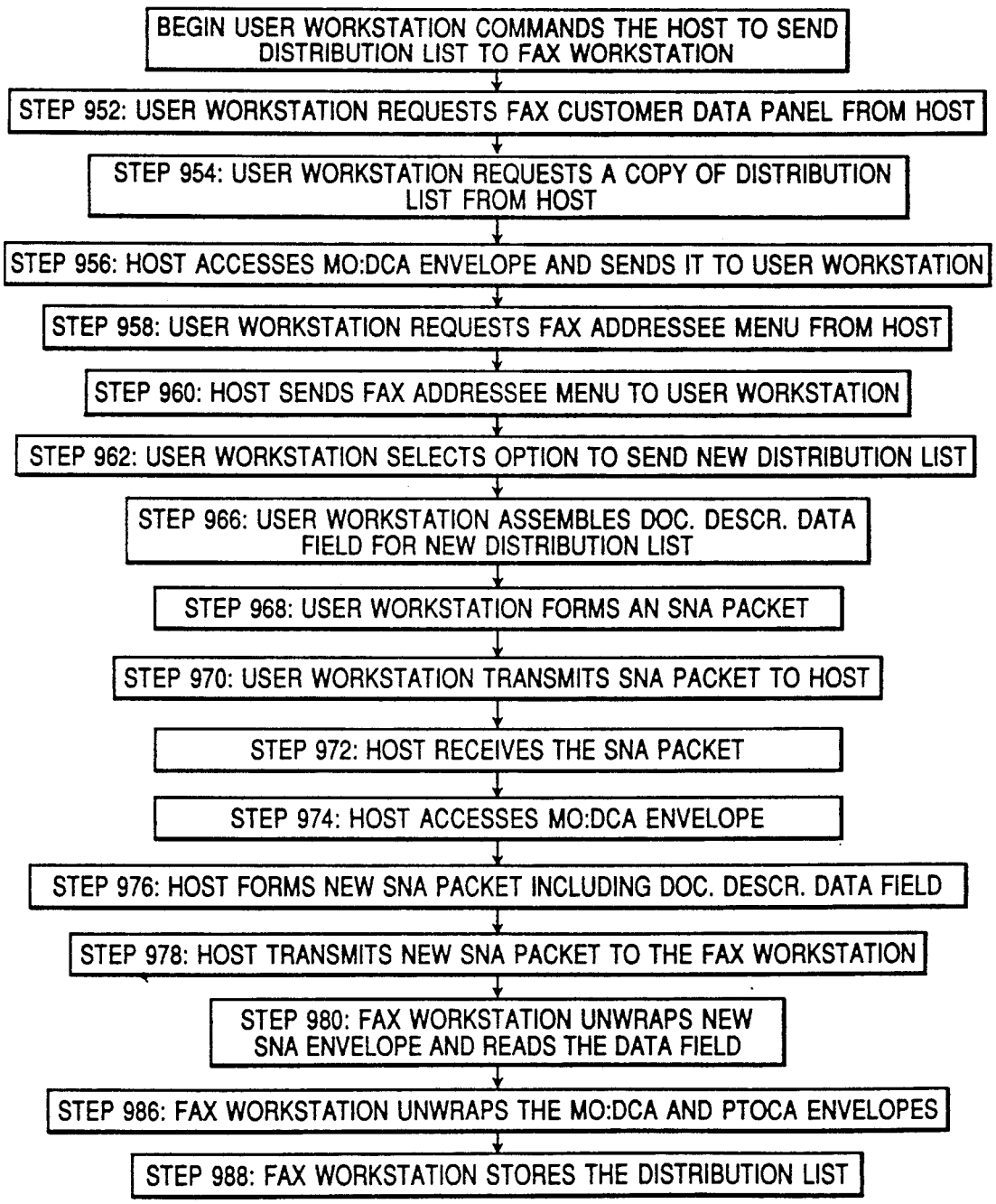
FIG. 9B shows a Flow Diagram of User Workstation Commanding the Host to Send Distribution List DL1 to FAX Workstation (FIG. 2B).
Figure 10A:
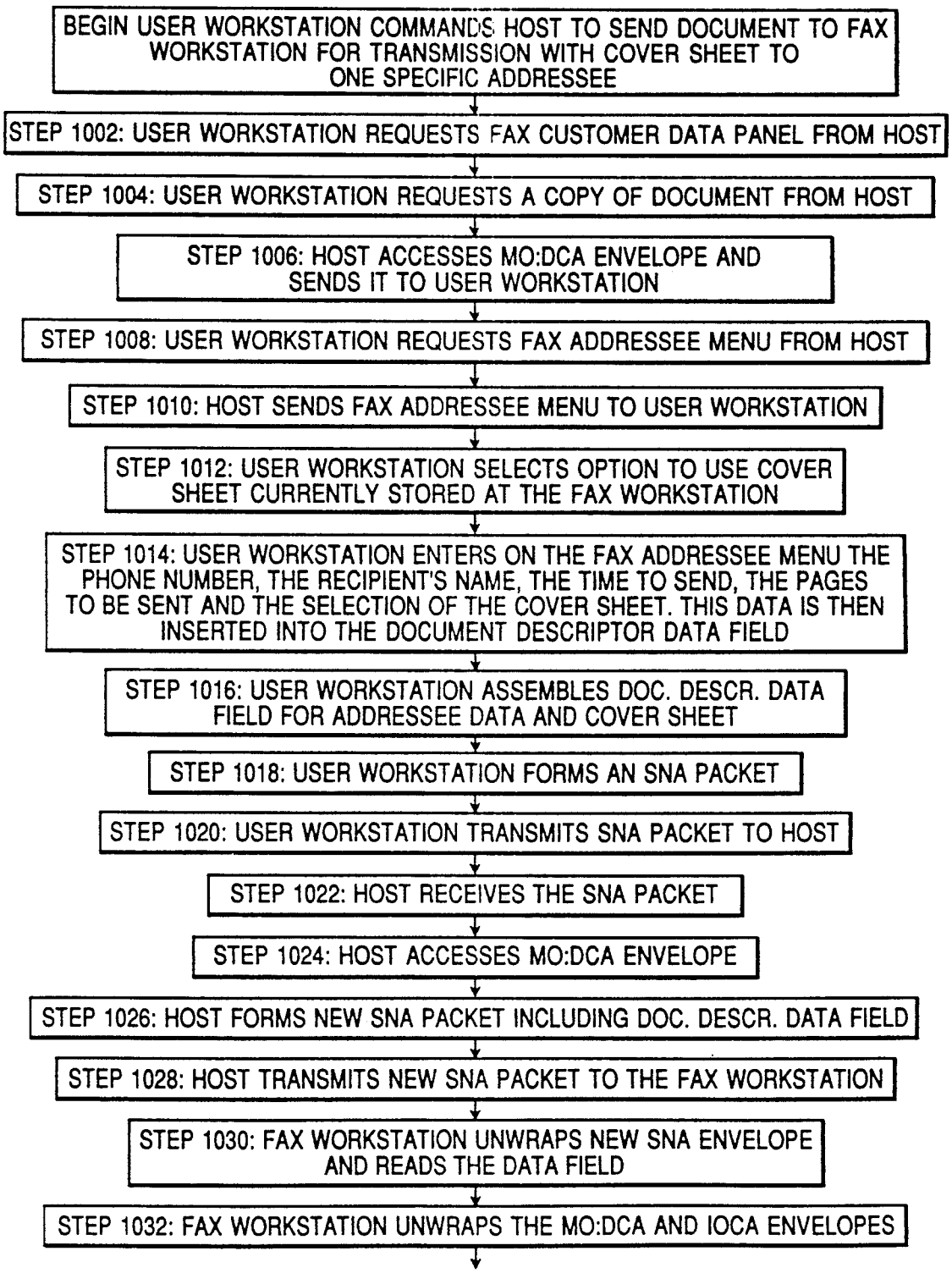
Figure 10B:
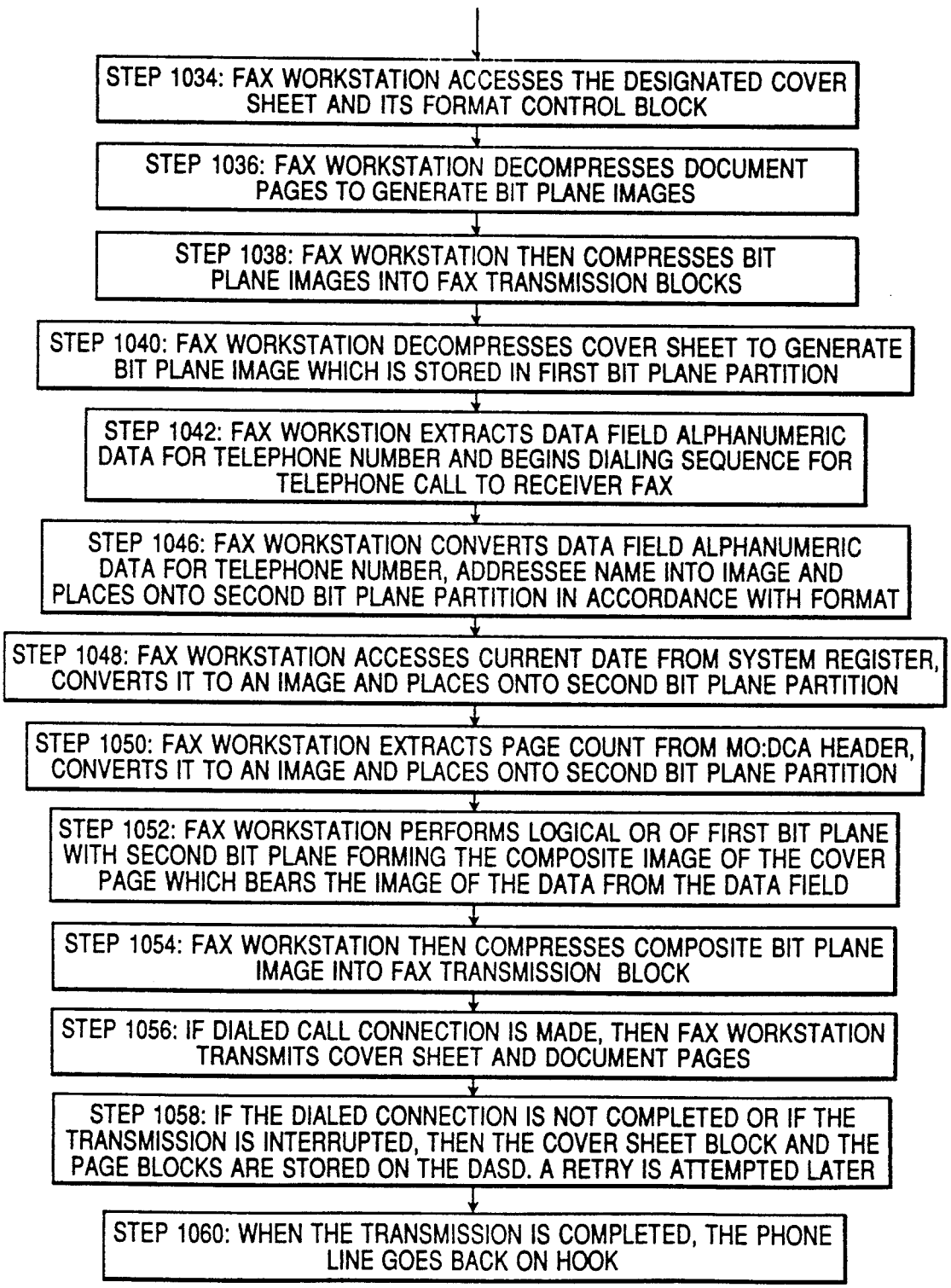

FIG. 9B Shows a Flow Diagram of User Workstation Commanding the Host to Send Distribution List DL1 to FAX Workstation (FIG. 2B). The steps of the method are as follows.

Step 952: User workstation requests FAX Customer Data Panel from Host (FIG. 12A).

Step 954: User Workstation requests a copy of Distribution List DL1 from Host for Viewing using FAX Customer Data Panel.

Step 956: Host Accesses MO:DCA Envelope 56, records its identity and sends it to User Workstation.

Step 958: User Workstation requests FAX Addressee menu from Host (FIG. 12B).

Step 960: Host sends FAX Addressee menu to User Workstation and records that User Workstation will be sending an output command to the Host to send a copy of MO:DCA Envelope 56 to the FAX Workstation.

Step 962: User Workstation selects the FAX Addressee menu option of sending a new distribution list to the FAX Workstation, Distribution List DL1 to be identified as "A" (FIG. 2B).

Step 966: User Workstation assembles Doc. Descr. Data Field 60 for New Distribution List with ID=A and indication that Distribution List is New (FIG. 1L).

Step 968: User Workstation forms an SNA Packet 75 with SNA Header 55, Doc. Descr. Data Field 60, and SNA Trailer 70 (FIG. 1Pa).

Step 970: User Workstation transmits SNA Packet 75 to Host as the anticipated output command.

Step 972: Host receives the SNA Packet 75 and Extracts the Doc. Descr. Data Field 60 (FIG. 1L).

Step 974: Host accesses MO:DCA Envelope 56 from Object Storage 47 (FIG. 1C).

Step 976: Host forms an SNA Packet 75 with SNA Header 55, Data Field 60 (FIG. 1L), MO:DCA Envelope 56 and SNA Trailer 70 (FIG. 1Pb).

Step 978: Host transmits the SNA Packet to the FAX Workstation (FIG. 4B).

Step 980: FAX Workstation unwraps the SNA envelope and reads the Data Field 60.

Step 986: FAX Workstation unwraps the MO:DCA and PTOCA Envelopes to extract DL1.

Step 988: FAX Workstation, in response to the Data Field 60 indication that this is a new distribution list, Stores the Distribution List DL1 in its DASD, accessible by its ID value of A (FIG. 5A and FIG. 5B).

As many as 75 different distribution lists DL1 through DL75 can be downloaded from the Host and stored on the FAX workstation. Any of the eight cover sheets can be selectively accessed and used for individual FAX transmissions or batch mode transmissions with any of the 75 distribution lists.

Figure 10:
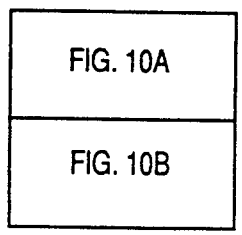
FIGS. 10A and 10B shows a flow diagram of the User Workstation Commands to the Host to Send Document Doc1 to the FAX Workstation for Transmission with Cover Sheet C1 to One Specific Addressee.

FIG. 10 Shows a flow diagram of the User Workstation Commands to the Host to Send Document Doc1 to the FAX Workstation for Transmission with Cover Sheet C1 to One Specific Addressee. Its steps are as follows.

Step 1002: User workstation requests FAX Customer Data Panel from Host (FIG. 12A).

Step 1004: User Workstation requests a copy of document Doc1 from Host for Viewing using FAX Customer Data Panel (similar to FIG. 2D).

Step 1006: Host Accesses MO:DCA Envelope 48, records its identity and sends it to User Workstation.

Step 1008: User Workstation requests FAX Addressee menu from Host (FIG. 12B).

Step 1010: Host sends FAX Addressee menu to User Workstation and records that User Workstation will be sending an output command to the Host to send a copy of MO:DCA Envelope 48 to the FAX Workstation.

Step 1012: User Workstation selects the FAX Addressee menu option of using cover sheet 3 currently stored at the FAX Workstation, Cover Sheet C1 (FIG. 12B).

Step 1014: User Workstation enters on the FAX addressee menu (FIG. 12B) the Phone Number, the Recipient's Name, the time to send, the pages to be sent and the selection of the cover sheet. This data is then inserted into the Document Descriptor Data Field 60 (FIG. 1J).

Step 1016: User Workstation assembles Doc. Descr. Data Field 60 for addressee data and Cover Sheet with ID=3 (FIG. 1J).

Step 1018: User Workstation forms an SNA Packet 75 with SNA Header 55, Doc. Descr. Data Field 60, and SNA Trailer 70 (FIG. 1Ra).

Step 1020: User Workstation transmits SNA Packet 75 to Host as the anticipated output command.

Step 1022: Host receives the SNA Packet 75 and Extracts the Doc. Descr. Data Field 60 (FIG. 1J).

Step 1024: Host accesses MO:DCA Envelope 48 from Object Storage 47 (FIG. 1C).

Step 1026: Host forms an SNA Packet 75 with SNA Header 55, Data Field 60 (FIG. 1J), MO:DCA Envelope 48 and SNA Trailer 70 (FIG. 1Rb).

Step 1028: Host transmits the SNA Packet to the FAX Workstation (FIG. 3).

Step 1030: FAX Workstation unwraps the SNA envelope and reads the Data Field 60.

Step 1032: FAX Workstation unwraps the MO:DCA and IOCA Envelopes to extract Doc1-1'''' and Doc1-2''''.

Step 1034: FAX Workstation, in response to the Data Field 60 indication that this is a specific, single FAX transmission, accesses the designated cover sheet C1'''' and its format control block CF1 from DASD with its ID value of 3 (FIG. 5B).

Step 1036: FAX workstation decompresses document pages Doc1-1'''' and Doc1-2'''' using CCITT G 4 to generate bit plane images Doc1-1' and Doc1-2'.

Step 1038: FAX workstation then compresses bit plane images Doc1-1' and Doc1-2' into FAX transmission blocks using CCITT G 3 algorithm, generating Doc1-1''' and Doc1-2'''.

Step 1040: FAX workstation decompresses Cover Sheet C1'''' using CCITT G 4 to generate bit plane image C1' which is stored in first bit plane partition (similar to FIG. 6A).

Step 1042: FAX workstation extracts Data Field 60 alphanumeric data for Telephone Number and begins dialing sequence for telephone call to receiver FAX.

Step 1046: FAX workstation converts Data Field 60 alphanumeric data for Telephone Number, Addressee Name into image and places onto second bit plane partition in accordance with format CF1 (similar to FIG. 6B).

Step 1048: FAX workstation accesses current Date from system register, converts it to an image and places onto second bit plane partition in accordance with CF1.

Step 1050: FAX workstation extracts page count from MO:DCA header, converts it to an image and places onto second bit plane partition in accordance with CF1.

Step 1052: FAX workstation performs logical OR of first bit plane with second bit plane forming the composite image C1" of the cover page which bears the image of the data from Data Field 60 (similar to FIG. 6B).

Step 1054: FAX workstation then compresses third bit plane image C1" into FAX transmission block using CCITT G 3 algorithm, generating C1''' (FIG. 7A).

Step 1056: If dialed call connection is made, then FAX workstation transmits Cover Sheet C1''' and two document pages Doc1-1''' and Doc1-2'''.

Step 1058: If the dialed connection is not completed or if the transmission is interrupted, then the C1''' cover sheet block and the Doc1-1''' and Doc1-2''' page blocks are stored on the DASD as shown in FIG. 7B. A retry is attempted later by accessing the DASD and redialing the call. The name data, number data and the retry count, as well as other data, are stored on the DASD along with the compressed blocks.

Step 1060: When the transmission is completed, the phone line goes back on hook.

Figure 11:
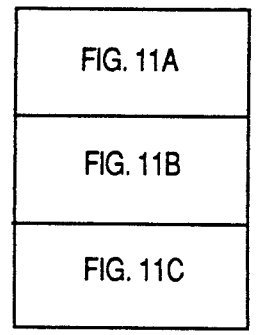
FIGS. 11A, 11B and 11C shows a flow diagram of the User Workstation Commands to the Host to Send Document Doc1 to the FAX Workstation for Transmission with Cover Sheet C1 to many addresses on a distribution list DL1.
Figure 11A:
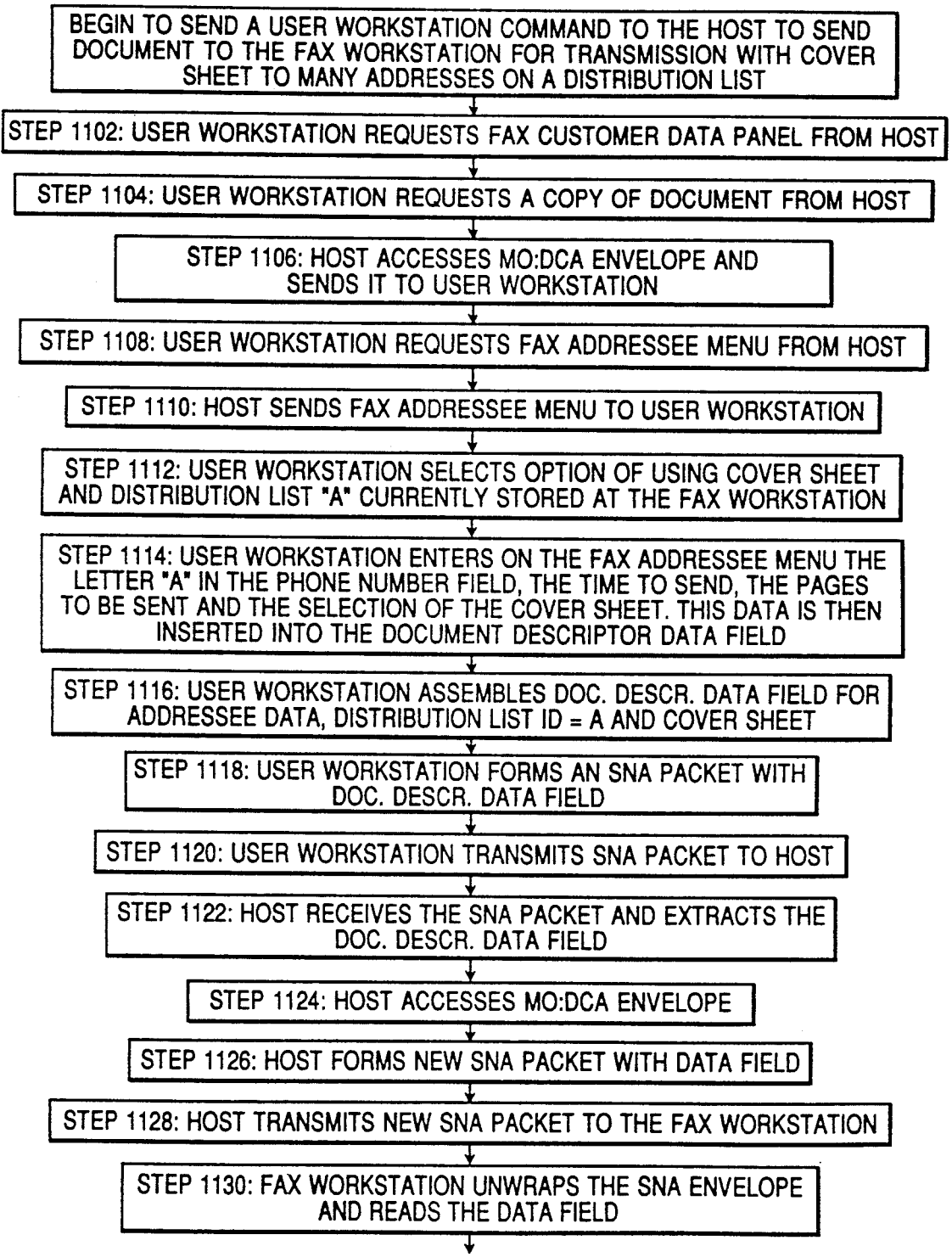
Figure 11B:
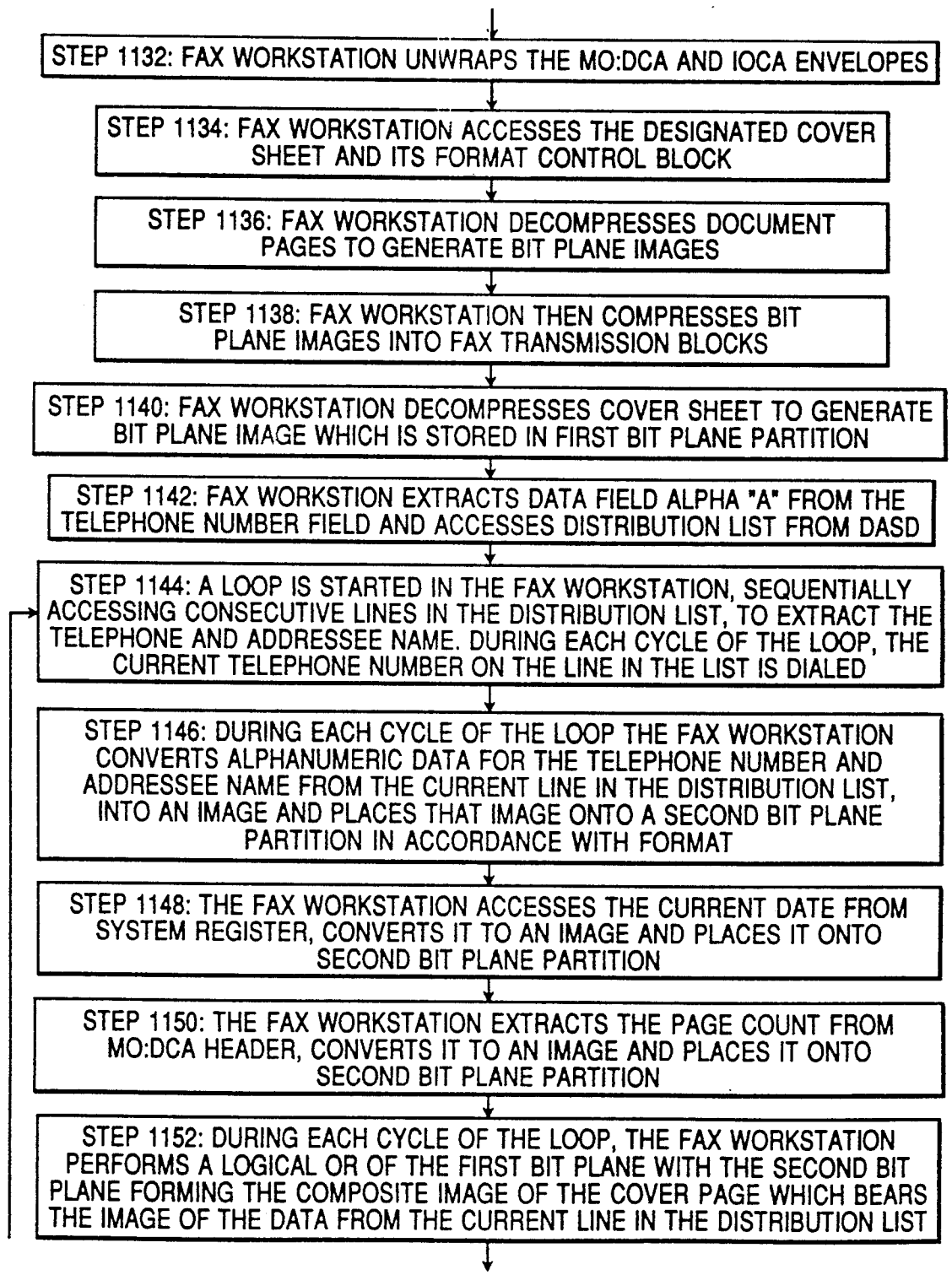
Figure 11C:
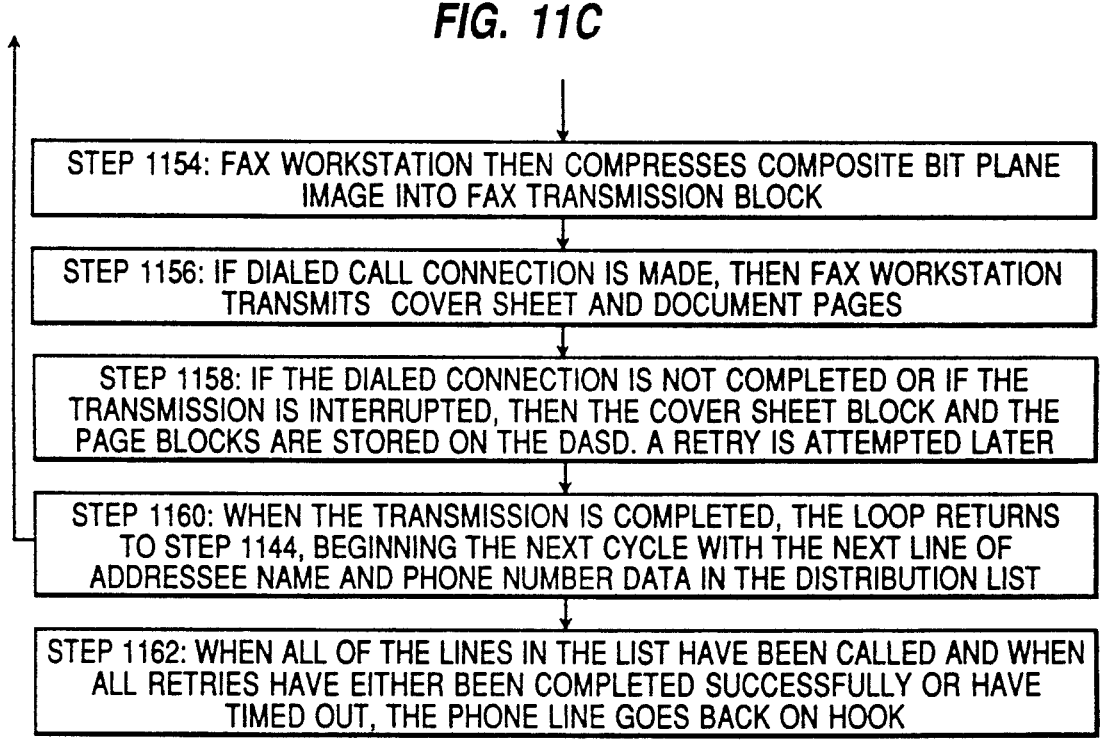

FIG. 11 Shows a flow diagram of the User Workstation Commands to the Host to Send Document Doc1 to the FAX Workstation for Transmission with Cover Sheet C1 to many addresses on a distribution list DL1. Its steps are as follows.

Step 1102: User workstation requests FAX Customer Data Panel from Host (FIG. 12A).

Figure 2D:
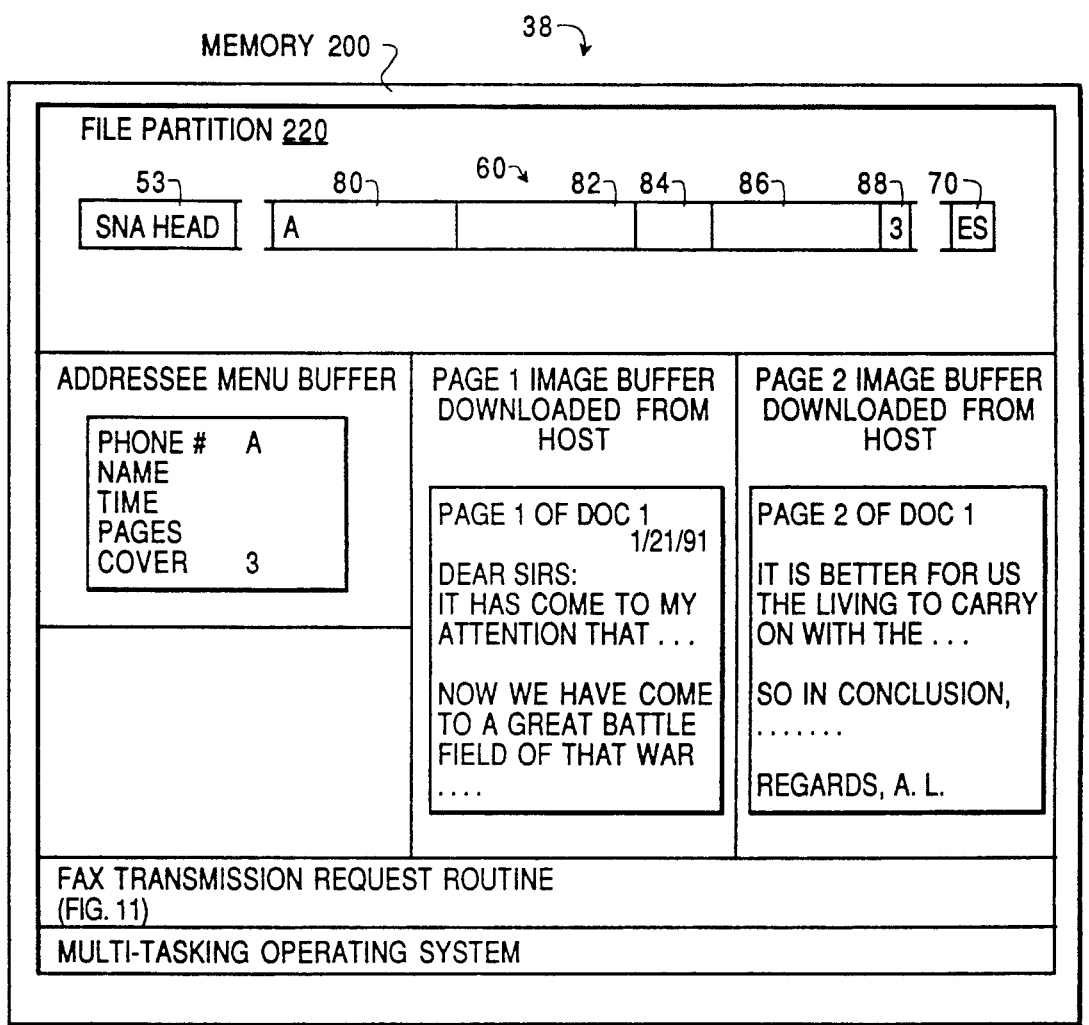
FIG. 2D shows the User Workstation in the Image System Prepare a Request to Host to Access Document Doc1 and Forward it to the FAX Workstation for Transmission to the Distribution List DL1 (ID=A) with Cover Sheet Number 3.

Step 1104: User Workstation requests a copy of document Doc1 from Host for Viewing using FAX Customer Data Panel (FIG. 2D).

Step 1106: Host Accesses MO:DCA Envelope 48, records its identity and sends it to User Workstation.

Step 1108: User Workstation requests FAX Addressee menu from Host (FIG. 12B).

Step 1110: Host sends FAX Addressee menu to User Workstation and records that User Workstation will be sending an output command to the Host to send a copy of MO:DCA Envelope 48 to the FAX Workstation.

Step 1112: User Workstation selects the FAX Addressee menu option of using cover sheet 3 and distribution list A. currently stored at the FAX Workstation, Cover Sheet C1 and distribution list DL1 (FIG. 12B).

Figure 1S:
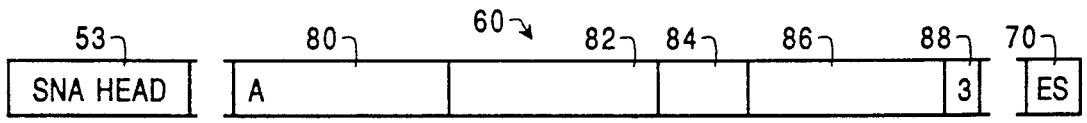
FIG. 1S*a* shows the SNA Packet Sent from User Workstation to Host with Document Descriptor Data Field 60 to access Document Doc1 from Host to Send to FAX Workstation for Transmission with Cover Sheet (ID=3) (stored at FAX Workstation) for Many FAX Addressees Using Distribution List DL1 (ID=A).
Figure 1S:
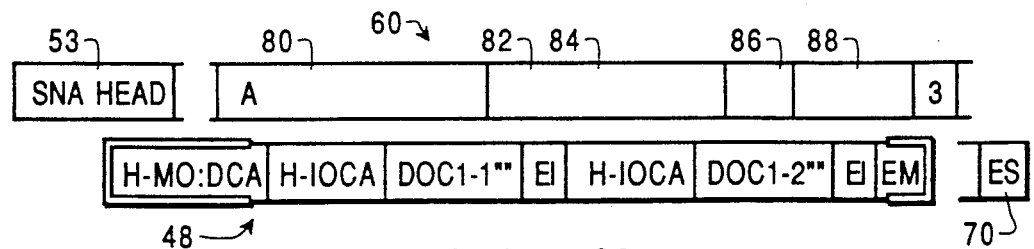

Step 1114: User Workstation enters on the FAX addressee menu (FIG. 12B) the letter "A" in the Phone Number field 80, the time to send, the pages to be sent and the selection of the cover sheet. This data is then inserted into the Document Descriptor Data Field 60 (FIG. 1Sa).

Step 1116: User Workstation assembles Doc. Descr. Data Field 60 for addressee data, distribution list ID=A and Cover Sheet with ID=3 (FIG. 1Sa).

Step 1118: User Workstation forms an SNA Packet 75 with SNA Header 55, Doc. Descr. Data Field 60, and SNA Trailer 70 (FIG. 1Sa).

Step 1120: User Workstation transmits SNA Packet 75 to Host as the anticipated output command.

Step 1122: Host receives the SNA Packet 75 and Extracts the Doc. Descr. Data Field 60 (FIG. 1Sa).

Step 1124: Host accesses MO:DCA Envelope 48 from Object Storage 47 (FIG. 1C).

Step 1126: Host forms an SNA Packet 75 with SNA Header 55, Data Field 60 (FIG. 1Sa), MO:DCA Envelope 48 and SNA Trailer 70 (FIG. 1Sb).

Step 1128: Host transmits the SNA Packet to the FAX Workstation (FIG. 3).

Step 1130: FAX Workstation unwraps the SNA envelope and reads the Data Field 60.

Step 1132: FAX Workstation unwraps the MO:DCA and IOCA Envelopes to extract Doc1-1'''' and Doc1-2''''.

Step 1134: FAX Workstation, in response to the Data Field 60 indication that this is a FAX transmission, accesses the designated cover sheet C1'''' and its format control block CF1 from DASD with its ID value of 3 (FIG. 5B).

Step 1136: FAX workstation decompresses document pages Doc1-1'''' and Doc1-2'''' using CCITT G 4 to generate bit plane images Doc1-1' and Doc1-2'.

Step 1138: FAX workstation then compresses bit plane images Doc1-1' and Doc1-2' into FAX transmission blocks using CCITT G 3 algorithm, generating Doc1-1''' and Doc1-2'''.

Step 1140: FAX workstation decompresses Cover Sheet C1'''' using CCITT G 4 to generate bit plane image C1' which is stored in first bit plane partition (FIG. 6A).

Step 1142: FAX workstation extracts Data Field 60 alpha "A" from the Telephone Number field 80 and accesses distribution list DL1 from DASD.

Step 1144: A loop is started in the FAX workstation, sequentially accessing consecutive lines in the distribution list, to extract the telephone and addressee name. During each cycle of the loop, the current telephone number on the line in the list is dialed.

Step 1146: During each cycle of the loop the FAX workstation converts alphanumeric data for the Telephone Number and Addressee Name from the current line in the distribution list, into an image and places that image onto a second bit plane partition in accordance with format CF1 (FIG. 6B).

Step 1148: The FAX workstation accesses the current Date from system register, converts it to an image and places it onto second bit plane partition in accordance with CF1.

Step 1150: The FAX workstation extracts the page count from MO:DCA header, converts it to an image and places it onto second bit plane partition in accordance with CF1.

Step 1152: During each cycle of the loop, the FAX workstation performs a logical OR of the first bit plane with the second bit plane forming the composite image C1" of the cover page which bears the image of the data from the current line in the distribution list DL1 (FIG. 6B).

Step 1154: FAX workstation then compresses third bit plane image C1" into FAX transmission block using CCITT G 3 algorithm, generating C1''' (FIG. 7A).

Step 1156: If dialed call connection is made, then FAX workstation transmits Cover Sheet C1''' and two document pages Doc1-1''' and Doc1-2'''.

Step 1158: If the dialed connection is not completed or if the transmission is interrupted, then the C1''' cover sheet block and the Doc1-1''' and Doc1-2''' page blocks are stored on the DASD as shown in FIG. 7B. A retry is attempted later by accessing the DASD and redialing the call. The name data, number data and the retry count, as well as other data, are stored on the DASD along with the compressed blocks.

Step 1160: When the transmission is completed, the loop returns to step 1144, beginning the next cycle with the next line of addressee name and phone number data in the distribution list DL1.

Step 1162: When all of the lines in the list DL1 have been called and when all retries have either been completed successfully or have timed out, the phone line goes back on hook.

The resulting invention provides an improved FAX server subsystem for an image archiving system which enables system-wide data stream compatibility.

The resulting invention also provides an improved FAX server subsystem for an image archiving system which forms a composite cover sheet image with the addressee text thereon.

The resulting invention further provides an improved FAX serve subsystem for an image archiving system which enables a plurality of cover sheet images and their associated overlay text to be stored on the DASD in the FAX server, to enable users throughout the image system to use customized cover sheets of their own personal design.

And the resulting invention provides an improved FAX server subsystem for an image archiving system which enables a plurality of distribution lists to be stored on the DASD in the FAX server, to enable user throughout the image system to use customized distribution lists of their own personal design.

Although a specific embodiment of the invention has been disclosed, it will be understood by those having skill in the art that changes can be made to that specific embodiment without departing from the spirit and the scope of the invention.

What is claimed is:

1. In an image archiving data processing system including a storage device coupled to a host data processor for storing object files representing documents, a subsystem for manipulating images of cover sheets and documents to be transmitted by facsimile, comprising:

a server processor coupled to said host data processor, having an I/O port coupled through a facsimile transponding means to a communications network, for transferring facsimile messages between said host and said network;

said storage device storing first, second and third object files;

said first object file having a format including a first image corresponding to a digitized cover sheet form image;

said second object file having a format including an alphanumeric string;

said third object file having a format including a second image corresponding to a digitized document image;

a workstation processor coupled to said host data processor, for requesting said host to transmit said first object file to said server processor with a first control expression indicating said digitized cover sheet form image;

said workstation processor requesting said host to transmit said second object file to said server processor with a second control expression indicating said alphanumeric string;

server storage means in said server processor, for storing said digitized cover sheet form image in a first server file and for storing said alphanumeric string in a second server file;

said workstation processor requesting said host to transmit said third object file to said server processor with a third control expression indicating said digitized document image, said third expression also indicating that a composite image of said digitized cover sheet image and said alphanumeric string is to be associated with said digitized document image;

alphanumeric image formation means coupled to said server storage in said server processor, for converting said alphanumeric string into an alphanumeric image in response to said third control expression;

image overlay means coupled to said alphanumeric image formation means in said server processor, for overlaying said alphanumeric image onto said digitized cover sheet form image, forming a composite cover sheet image in response to said third control expression;

facsimile image formation means coupled to said image overlay means, for converting said composite cover sheet image into a first facsimile transmission unit representing said composite cover sheet and outputting it to said facsimile transponding means;

said facsimile image formation means coupled to receive said digitized document image, for converting it into a second facsimile transmission unit representing said document image and outputting it to said facsimile transponding means.

2. The data processing system of claim 1, wherein said first, second and third object files are in Mixed Object Document Content Architecture format.

3. The data processing system of claim 2, wherein said first object file is an IOCA image object wrapped in a first MO:DCA envelope.

4. The data processing system of claim 3, wherein said first MO:DCA envelope is encapsulated in a first SNA packet between a first SNA header and an SNA trailer while being transmitted from said host to said server processor, said first control expression being located in a first document descriptor field in said first SNA header.

5. The data processing system of claim 4, wherein said second object file is a PTOCA text object wrapped in a second MO:DCA envelope.

6. The data processing system of claim 5, wherein said second MO:DCA envelope is encapsulated in a second SNA packet between a second SNA header and an SNA trailer while being transmitted from said host to said server processor, said second control expression being located in a second document descriptor field in said second DNA header.

7. The data processing system of claim 6, wherein said third object file is an IOCA image object wrapped in a third MO:DCA envelope.

8. The data processing system of claim 7, wherein said third MO:DCA envelope is encapsulated in a third SNA packet between a third SNA header and an SNA trailer while being transmitted from said host to said server processor, said third control expression being located in a third document descriptor field in said third SNA header.

9. The data processing system of claim 8, wherein said alphanumeric string in said second object file is an addressee distribution list including a plurality of telephone numbers.

10. The data processing system of claim 9, wherein said server processor further comprises:

telephone dialing means coupled to receive said addressee distribution list, for consecutively dialing a current one telephone number of said plurality of telephone numbers;

said alphanumeric image formation means consecutively converting said current one telephone number to a current alphanumeric image in response to said third control expression;

said image overlay means consecutively overlaying said current alphanumeric image onto said digitized cover sheet form image, forming a current composite cover sheet image in response to said third control expression;

said facsimile image formation means consecutively converting said current composite cover sheet image into a current first facsimile transmission unit representing said current composite cover sheet and outputting it to said facsimile transponding means;

whereby said server processor transmits a plurality of facsimile messages to a plurality of addressees in response to said third control expression.

11. The data processing system of claim 10, wherein said server processor further comprises:

retry means coupled to said telephone dialing means, for logging incomplete calls from said plurality of telephone numbers on said list, and for retrying dialing of said telephone numbers corresponding to said incomplete calls.

12. The data processing system of claim 1, wherein a plurality of object files are stored at said server processor representing a plurality of digitized cover sheet form images.

13. The data processing system of claim 1, wherein a plurality of object files are stored at said server processor representing a plurality of addressee distribution lists, including a plurality of telephone numbers.

14. The data processing system of claim 1, wherein said server processor further comprises:

said facsimile transponding means receiving a facsimile image of a cover sheet from said communications network;

editing means coupled to said facsimile transponding means, for editing the appearance of said received facsimile image, forming an edited cover sheet image;

said editing means coupled to said server storage means, for storing said edited cover sheet image therein.

15. The data processing system of claim 14, wherein said editing means includes means for selecting coordinates for the location of said alphanumeric image on said edited cover sheet image.

16. The data processing system of claim 1, wherein said server processor further comprises:

editing means coupled to said server storage means, for accessing said digitized cover sheet form image from said server storage means and editing the appearance thereof, forming an edited cover sheet image;

said editing means storing said edited cover sheet image in said server storage means.

17. In an image archiving data processing system including a storage device coupled to a host data processor for storing object files representing documents, a method for manipulating images of cover sheets and documents to be transmitted by facsimile, comprising:

storing first, second and third object files in said storage device;

said first object file having a format including a first image corresponding to a digitized cover sheet form image;

said second object file having a format including an alphanumeric string;

said third object file having a format including a second image corresponding to a digitized document image;

requesting said host to transmit said first object file to a server processor with a first control expression indicating said digitized cover sheet form image;

requesting said host to transmit said second object file to said server processor with a second control expression indicating said alphanumeric string;

storing said digitized cover sheet form image and storing said alphanumeric string in a server storage means in said server processor;

requesting said host to transmit said third object file to said server processor with a third control expression indicating said digitized document image, said third expression also indicating that a composite image of said digitized cover sheet image and said alphanumeric string is to be associated with said digitized document image;

converting said alphanumeric string into an alphanumeric image in response to said third control expression;

overlaying said alphanumeric image into said digitized cover sheet form image, forming a composite cover sheet image in response to said third control expression;

converting said composite cover sheet image into a first facsimile transmission unit representing said composite cover sheet and outputting it to a facsimile transponding means;

converting said document image into a second facsimile transmission unit representing said composite cover sheet and outputting it to said facsimile transponding means.

18. The data processing method of claim 17, wherein said alphanumeric string in said second object file is an addressee distribution list including a plurality of telephone numbers.

19. The data processing method of claim 17, wherein said first, second and third object files are in Mixed Object Document Content Architecture format.

20. The data processing method of claim 19, wherein said first object file is an IOCA image object wrapped in a first MO:DCA envelope.

21. The data processing method of claim 20, wherein said first MO:DCA envelope is encapsulated in a first SNA packet between a first SNA header and an SNA trailer while being transmitted from said host to said server processor, said first control expression being located in a first document descriptor field in said first SNA header.

22. The data processing method of claim 21, wherein said second object file is a PTOCA text object wrapped in a second MO:DCA envelope.

23. The data processing method of claim 22, wherein said second MO:DCA envelope is encapsulated in a second SNA packet between a second SNA header and an SNA trailer while being transmitted from said host to said server processor, said second control expression being located in a second document descriptor field in said second SNA header.

24. The data processing method of claim 23, wherein said third object file is an IOCA image object wrapped in a third MO:DCA envelope.

25. The data processing method of claim 24, wherein said third MO:DCA envelope is encapsulated in a third SNA packet between a third SNA header and an SNA trailer while being transmitted from said host to said server processor, said third control expression being located in a third document descriptor field in said third SNA header.

26. The data processing method of claim 25, wherein said alphanumeric string in said second object file is an addressee distribution list including a plurality of telephone numbers.

27. The data processing method of claim 26, which further comprises:
consecutively dialing a current one telephone number of said plurality of telephone numbers;
consecutively converting said current one telephone number to a current alphanumeric image in response to said third control expression;
consecutively overlaying said current alphanumeric image onto said facsimile cover sheet form image, forming a current composite cover sheet image in response to said third control expression;
consecutively converting said current composite cover sheet image into a current first facsimile transmission unit representing said current composite cover sheet and outputting it to said facsimile transponding means;
whereby a plurality of facsimile messages are transmitted to a plurality of addressees in response to said third control expression.

28. The data processing method of claim 27, which further comprises:
logging incomplete calls from said plurality of telephone numbers on said list, and for retrying dialing of said telephone numbers corresponding to said incomplete calls.

29. The data processing method of claim 17, wherein a plurality of object files are stored at said server processor representing a plurality of digitized cover sheet form images.

30. The data processing method of claim 17, wherein a plurality of object files are stored at said server processor representing a plurality of addressee distribution lists, including a plurality of telephone numbers.

31. The data processing method of claim 17, which further comprises:
receiving a facsimile image of a cover sheet from said communications network;
editing the appearance of said received facsimile image forming an edited cover sheet image;
storing said edited cover sheet image therein.

32. The data processing method of claim 31, wherein said editing includes selecting coordinates for the location of said alphanumeric image on said edited cover sheet image.

33. The data processing method of claim 17, which further comprises:
accessing said digitized cover sheet form image from said server storage means and editing the appearance thereof, forming an edited cover sheet image;
storing said edited cover sheet image in said server storage means.

34. The data processing method of claim 17, wherein said alphanumeric string in said second object file is an addressee distribution list including a plurality of telephone numbers.

35. The data processing method of claim 34, which further comprises:
consecutively dialing a current one telephone number of said plurality of telephone numbers;
consecutively converting said current one telephone number to a current alphanumeric image in response to said third control expression;
consecutively overlaying said current alphanumeric image onto said digitized cover sheet form image, forming a current composite cover sheet image in response to said third control expression;
consecutively converting said current composite cover sheet image into a current first facsimile transmission unit representing said current composite cover sheet and outputting it to said facsimile transponding means;
whereby a plurality of facsimile messages are transmitted to a plurality of addressees in response to said third control expression.

* * * * *